United States Patent
Kazama et al.

(10) Patent No.: US 7,054,022 B2
(45) Date of Patent: May 30, 2006

(54) IMAGE FORMING APPARATUS MANAGEMENT SYSTEM

(75) Inventors: Hiroatsu Kazama, Kanagawa (JP); Takashi Abe, Kanagawa (JP); Shinji Hozumi, Kanagawa (JP); Takuyoshi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 967 days.

(21) Appl. No.: 09/955,105

(22) Filed: Sep. 19, 2001

(65) Prior Publication Data

US 2002/0097427 A1    Jul. 25, 2002

(30) Foreign Application Priority Data

Jan. 23, 2001    (JP)    ............ P.2001-014304

(51) Int. Cl.
*G06F 15/00*    (2006.01)
(52) U.S. Cl. ............ 358/1.15; 358/1.9; 379/100.01; 379/100.11; 379/100.12; 709/203
(58) Field of Classification Search ............ 358/1.15; 379/100.01, 100.11, 100.12
See application file for complete search history.

(56) References Cited

U.S. PATENT DOCUMENTS

| | | | | |
|---|---|---|---|---|
| 5,220,674 A | * | 6/1993 | Morgan et al. | 709/223 |
| 5,537,626 A | * | 7/1996 | Kraslavsky et al. | 710/8 |
| 5,680,615 A | * | 10/1997 | Marlin et al. | 707/103 R |
| 5,778,377 A | * | 7/1998 | Marlin et al. | 707/103 R |
| 5,995,723 A | * | 11/1999 | Sperry et al. | 358/1.15 |
| 6,173,295 B1 | * | 1/2001 | Goertz et al. | 715/505 |
| 6,188,487 B1 | * | 2/2001 | Matsubara | 358/1.15 |
| 6,515,756 B1 | * | 2/2003 | Mastie et al. | 358/1.15 |
| 6,567,176 B1 | * | 5/2003 | Jeyachandran et al. | 358/1.14 |
| 6,798,530 B1 | * | 9/2004 | Buckley et al. | 358/1.13 |

FOREIGN PATENT DOCUMENTS

| | | |
|---|---|---|
| JP | 10-161707 | 6/1998 |
| JP | 10-240461 | 9/1998 |
| JP | 11-170669 | 6/1999 |
| JP | 11-203079 | 7/1999 |

* cited by examiner

*Primary Examiner*—Edward Coles
*Assistant Examiner*—Mark R. Milia
(74) *Attorney, Agent, or Firm*—Morgan, Lewis & Bockius LLP

(57) ABSTRACT

An image forming apparatus management system for setting various parameters of the image forming apparatus according to a job instruction from the client machine 2 comprises a host server 4 equipped with an external database 5 for storing various parameters of the image forming apparatus 1 corresponding to the predetermined job conditions, said host server retrieving various parameters satisfying the job conditions from the external database 5 according to the external parameter request and delivering the parameters, and a client server 3 connected to said host server 4 in a bidirectionally communicable way, said client server associated with communications between said client machine 2 and the image forming apparatus 1 and making an external parameter request to the host server 4 as well as supplying various parameters delivered from the host server 4 to the image forming apparatus 1.

14 Claims, 17 Drawing Sheets

FIG. 14

| MANUFACTURER | BRAND | BASIS WEIGHT | TEMPERATURE | HUMIDITY | BIAS ROLL | AIR BLOWER | TRANSFER VOLTAGE |
|---|---|---|---|---|---|---|---|
| AAAAA | aaaaa | 90gsm | ~ 10°C | ~ 40% | 115 PULSE | ON | y = x + a1 |
| | | | | 40 ~ 65% | 115 PULSE | ON | y = x |
| | | | | 65 ~ 70% | 70 PULSE | ON | y = x + a2 |
| | | | | 70% ~ | 65 PULSE | ON | y = x + a2 |
| | | | 10 ~ 18°C | ~ 40% | 70 PULSE | ON | y = x + a1 |
| | | | | 40 ~ 65% | 60 PULSE | ON | y = x + a1 |
| | | | | 65 ~ 70% | 60 PULSE | ON | y = x |
| | | | | 70% ~ | 55 PULSE | ON | y = x |
| | | | 18 ~ 25°C | ~ 40% | 70 PULSE | ON | y = x + a1 |
| | | | | 40 ~ 65% | 60 PULSE | ON | y = x + a1 |
| | | | | 65 ~ 70% | 60 PULSE | ON | y = x |
| | | | | 70% ~ | 55 PULSE | ON | y = x |
| | | | 25°C ~ | ~ 40% | 70 PULSE | ON | y = x |
| | | | | 40 ~ 65% | 60 PULSE | ON | y = x |
| | | | | 65 ~ 70% | 60 PULSE | ON | y = x |
| | | | | 70% ~ | 55 PULSE | ON | y = x |
| BBBBB | bbbbb | 82gsm | ~ 10°C | ~ 40% | 130 PULSE | OFF | y = x + a1 |
| | | | | 40 ~ 65% | 110 PULSE | OFF | y = x + a3 |
| | | | | 65 ~ 70% | 60 PULSE | OFF | y = x + a3 |
| | | | | 70% ~ | 60 PULSE | OFF | y = x + a3 |
| | | | 10 ~ 18°C | ~ 40% | 85 PULSE | OFF | y = x + a1 |
| | | | | 40 ~ 65% | 70 PULSE | OFF | y = x + a1 |
| | | | | 65 ~ 70% | 70 PULSE | OFF | y = x + a3 |
| | | | | 70% ~ | 65 PULSE | OFF | y = x + a3 |
| | | | 18 ~ 25°C | ~ 40% | 85 PULSE | OFF | y = x + a1 |
| | | | | 40 ~ 65% | 70 PULSE | OFF | y = x + a1 |
| | | | | 65 ~ 70% | 70 PULSE | OFF | y = x + a3 |
| | | | | 70% ~ | 65 PULSE | OFF | y = x + a3 |
| | | | 25°C ~ | ~ 40% | 75 PULSE | OFF | y = x + a4 |
| | | | | 40 ~ 65% | 70 PULSE | OFF | y = x + a4 |
| | | | | 65 ~ 70% | 70 PULSE | OFF | y = x + a4 |
| | | | | 70% ~ | 60 PULSE | OFF | y = x + a4 |

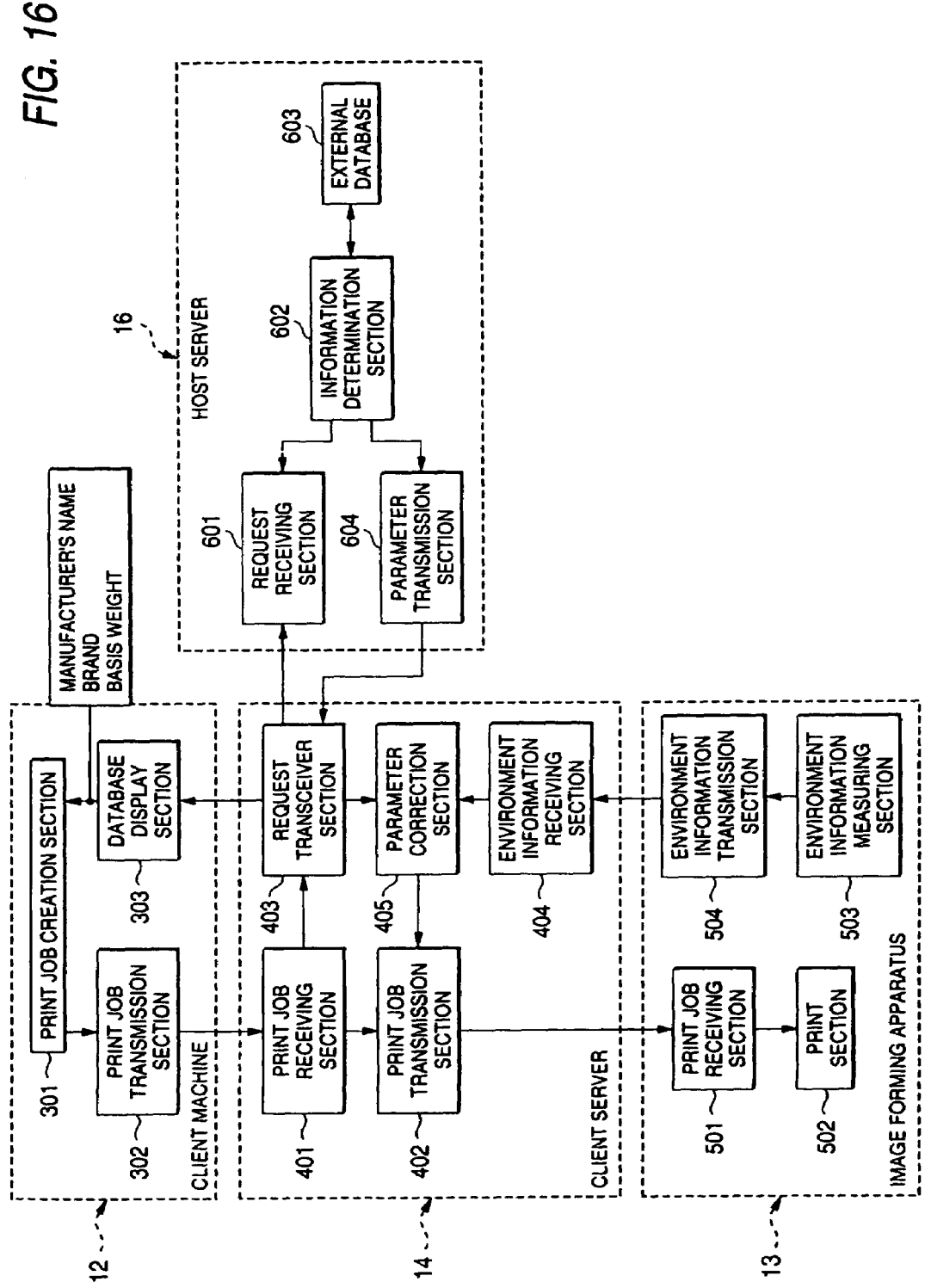

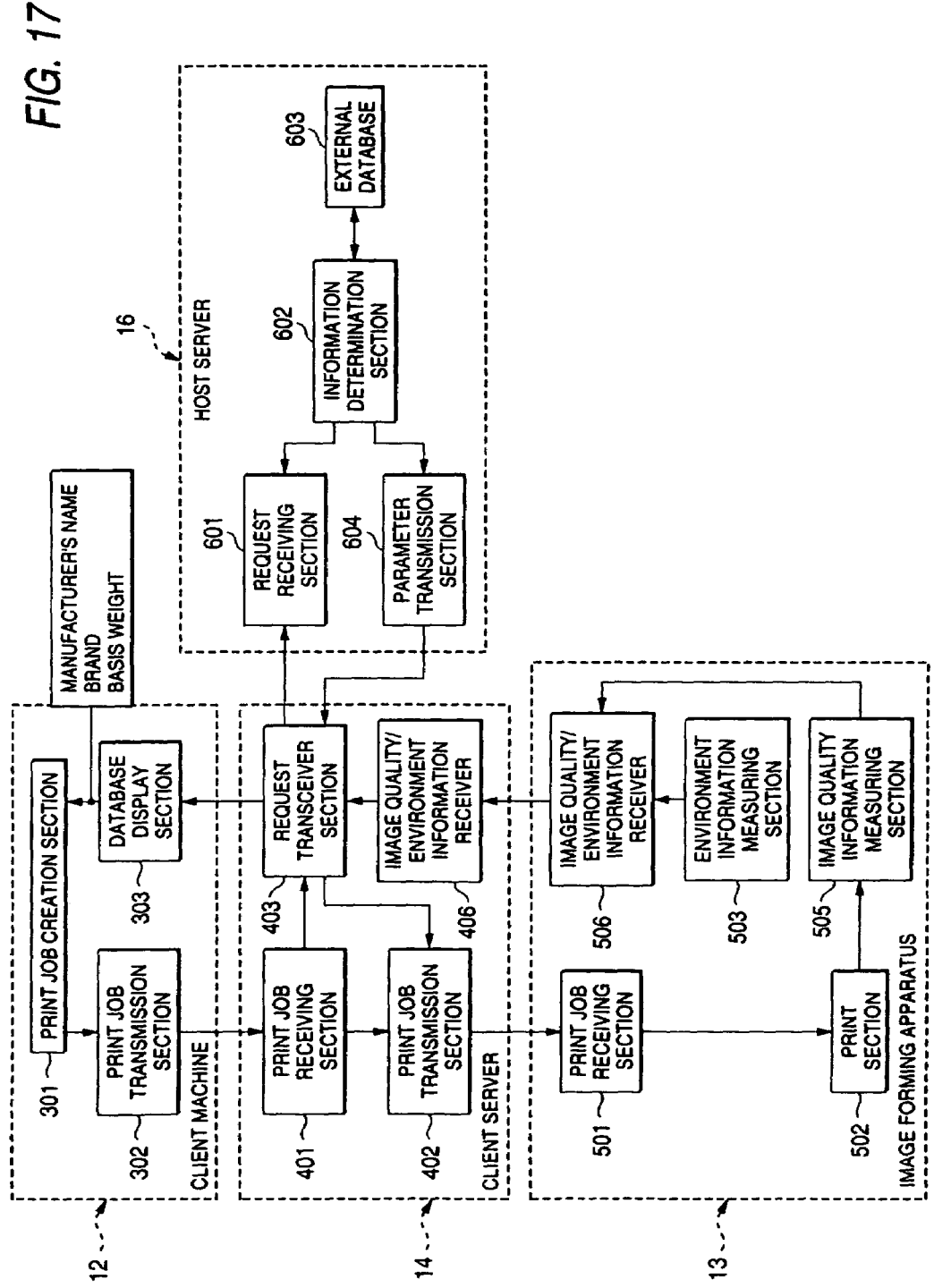

IMAGE FORMING APPARATUS MANAGEMENT SYSTEM

BACKGROUND OF THE INVENTION

1. Filed of the Invention

The present invention relates to an image forming apparatus management system for managing image forming apparatus to perform predetermined jobs, such as printer, and in particular to an image forming apparatus management system for setting a variety of parameters of image forming apparatus according to a job instruction from a client machine.

2. Description of the Related Art

Such an image forming apparatus management system according to the related art is, for example, a printer management system for performing print jobs.

Recently, numerous sophisticated image forming apparatus have been proposed. This type of image forming apparatus is equipped with various parameter adjustment mechanisms and, in order to increase reliability, entrusts use information of the parameter adjustment mechanism to input by a client to adjust the parameter adjustment mechanisms.

However, in case that parameters of the parameter adjustment mechanism are entirely entrusted to the input by a client, there is concerns about parameter input errors by the client. Further, in case that parameter setting range is specified only roughly, use conditions for image forming apparatus are not optimum. Thus, it is difficult to say that an image forming apparatus is used under the optimum conditions.

As a related art 1 for solving such a trouble, a technology is proposed in which parameters are transmitted from a server to an image forming apparatus connected via a network according to details of a print job to be carried out (see the Japanese Patent Laid-Open No. 240461/1998).

As another related art 2, a technology is proposed in which a user server and a maker server are connected with each other and image forming apparatus control software is used in case that the image forming apparatus control software has been updated when a request is made to check update of the image forming apparatus control software, and otherwise the latest-version image forming apparatus control software is downloaded from the maker server (see the Japanese Patent Laid-Open No. 203079/1999).

As another related art 3, a technology is proposed in which print information such as setup utilities, drivers, print setting information, and documents is retrieved based on location information on a wide area network to retrieve such information on a host computer and setting of printing apparatus is made on the host computer (see the Japanese Patent Laid-Open No. 170669/1999).

Incidentally, as another related art 4, a technology has already been known in public in which, in Factory Automation (FA) system, various kinds of files of an inspection device and a control device are stored in a FA server to update the files by a personal computer at central office (see the Japanese Patent Laid-Open No. 161707/1998).

However, in such image forming apparatus management system, available paper comes in a variety of brands. General basis weight or size information helps to set parameters only roughly and it is being difficult to perform optimum adjustment of an image forming apparatus.

Thus, in order to fulfill the maximum image forming apparatus performance in image forming apparatus management system of this type, for example, if the "brand of paper" itself is recognized and information specialized in the brand of paper is obtained, such as basis weight of paper/surface state/sturdiness/other extensive information, it is considered to become possible to set optimum parameters specialized in the brand of paper.

Among image forming apparatus management systems according to the related arts, for example, the related art 1 transmits parameters from a server to an image forming apparatus according to the details of a print job. Here, the parameters are nothing but things used to reference the configuration of the image forming apparatus (type of image forming apparatus, number of units, performance, current state) to select the optimum image forming apparatus in response to user's request (paper size, print quality, color, time limit). These parameters are not assumed the aforementioned "brand of paper" that may fulfill the maximum performance of the selected image forming apparatus.

If image forming apparatus management system is implemented in which each of parameters specialized in the "brand of paper" is stored in the server of the related art 1, capacity of each of parameters specialized in the brand of paper is huge. Moreover, assuming each user updates the brand of paper as required, such an image forming apparatus management system is extremely cumbersome and expensive to the user.

The related art 2 is a technology in which the latest image forming apparatus control software is always provided on the maker server and image forming apparatus control software is delivered to the image forming apparatus from the maker server via the user server. In this practice, what is delivered is only image forming apparatus control software. This system is not assumed delivery of various parameters of the image forming apparatus.

On the contrary, the related art 3 is a technology in which various print information (setup utilities, drivers, print setting information and documents) is obtained on the host computer and setting of the printing apparatus (an image forming apparatus) is made on the host computer. However, various print information refers to the minimum information necessary for the printing apparatus to execute a print job. These parameters is not assumed parameters specialized in the aforementioned "brand of paper" that may fulfill the maximum performance of the image forming apparatus.

The related art 4 is a technology in which files in a server are updated from a PC in the center office. This technology is not assumed parameters specialized in the aforementioned "brand of paper" that may fulfill the maximum performance of the image forming apparatus.

Even when a system is established where necessary information is transmitted from a host server such as a maker server, host computer or a PC in the center office to a machine such as image forming apparatus as in the related arts 2 through 4, it is impossible to implement image forming apparatus management system to allow setting of various parameters that may fulfill the maximum performance of the image forming apparatus only by transmitting the latest image forming apparatus control software or the minimum information necessary for executing a print job.

Such technical problems are not only caused in an aforementioned image forming apparatus management system but also caused in an image forming apparatus management system that manages various parameters of an image forming apparatus such as printer.

SUMMARY OF THE INVENTION

The invention has been proposed to solve the aforementioned technical problems and aims at providing an image forming apparatus management system that allows easy and efficient setting of various parameters of an image forming apparatus in order to fulfill the maximum performance of the image forming apparatus.

The invention is a basic model that utilizes external databases and aims at optimization of various parameters of an image forming apparatus. For example, as shown in FIG. 1, an image forming apparatus management system comprises: a client machine 2 (2(1) to **2(*j*)) adapted to issue a job instruction including a job condition; an image forming apparatus 1(1(1) to 1(*i*)) having a parameter adjustment unit, the image forming apparatus 1 being set a value of a parameter in accordance with the job instruction; a host server 4 having an external database 5 storing a plurality of values of the parameter corresponding to predetermined job conditions, respectively; and a client server 3 connected to the client machine 2, to the image forming apparatus 1, and to the host server 4, the client server 3 enabling to communicate with the host server 4 mutually, wherein the client server 3 transmits an external parameter request to the host server 4 and transmits a value of the parameter transmitted from the host server 4 to the image forming apparatus 1; and the host server 4 retrieves a value of the parameter meeting the job condition from the external database 5 to transmit the retrieved value of the parameter to the client server 3** in response to the external parameter request.

In such technical means, the image forming apparatus 1 broadly refers to a machine to execute jobs, and in case the jobs are print jobs, the image forming apparatus is a printer.

The client machine 2 broadly refers to a machine operated by a client (such as a PC, workstation, or the like).

While the image forming apparatus 1 and the client machine 2 may be singular, respectively, typically at least a plurality of image forming apparatus 1 or a plurality of client machines 2 are arranged. The image forming apparatus 1 and the client machine 2 is for example connected a network via the client server 3.

FIG. 1 shows a model where a plurality of image forming apparatus 1 and a plurality of client machines are arranged.

Further, the host server 4 needs to comprise an external database 5. The external database 5 may be provided inside the server 4 or separately from the host server 4.

Data stored in the external database 5 are a plurality of values of the parameter of the image forming apparatus 1 corresponding to the predetermined job conditions. The job condition denotes a condition having an influence on a process of the image forming apparatus. Specifically, the job condition is, for example, a manufacturer of paper, brand of paper, basis weight of paper, size of paper, surface formed an image of paper, or a direction setting paper. The "predetermined job condition" typically refer to a part of specific job conditions in many cases but may be all of the job conditions.

In case that, for example, the image forming apparatus 1 is a printer, the "predetermined job condition" includes, for example, the "manufacturer of paper", "brand of paper", and "basis weight of paper." The parameter of the image forming apparatus 1 corresponding to the job conditions are parameters to be given to the parameter adjustment mechanism of the image forming apparatus 1.

Further, the host server 4 comprises at least an external database search feature and a various parameters transmitting feature. On the other hand, the client server 3 comprises at least an external parameter request feature and a transmitted parameter supply feature.

In this practice, the host server 4 and the client server 3 may be singular in terms of feature, but may be plural in case necessary in terms of system implementation.

The client server 3 may always transmit the external parameter request to the host server 4. However, the external parameter request is not necessary depending on the client, so that the external parameter request is selectively made according to necessity to allow more efficient parameter setting. From this viewpoint, the client server 3 preferably makes an external parameter request to the host server 4 according to the request from the client machine 2 (for example 2(1)).

Here, a representative example of selectively transmitting the external parameter request will be discussed. The image forming apparatus management system further comprising an internal data base (not shown) storing a plurality of values of the parameter corresponding to predetermined standard conditions, respectively, the internal data base disposed in one of the image forming apparatus 1, the client server 3, and the client machine 2, wherein the client server 3 determines whether the external data base 5 is used or not; when the external data base 5 is used, the host server 4 retrieves a value of the parameter meeting the job condition from the external database 5 to transmit the retrieved value of the parameters to the client server 3 in response to the external parameter request; when the external data base 5 is not used, the client server 3 retrieves a value of the parameter meeting the job condition from the internal database to transmit the retrieved value of the parameter to the image forming apparatus 1.

According to this example, in case that the external parameter request has not been made, the values of the parameters meeting the standard job conditions is retrieved from the internal database, and thus the standard job can be accelerated.

While the external database 5 owned by the host server 4 may be fixed, from the viewpoint that the latest external database 5 is maintained to upgrade the reliability of external parameter delivery, the host server 4 preferably updates the external database 5 on a routine basis.

Thus, in an example where the external database 5 is updated, from the viewpoint of facilitating understanding of the update state of the external database, the client machine 2 may display whether the external database 5 of the host server 4 has been updated on a display section thereof.

Moreover, while delivery of external parameters of the host server 4 may be made via a generally known system such as HTTP or CGI program, from the viewpoint of efficient delivery of external parameters, it is preferable that when the client server 3 transmits the external parameter request to the host server 4, the host server 4 transmits a job condition item information of the external database 5 to the client machine 2 via the client server 3, and when a predetermined job condition item is selected at the client machine 2, the host server 4 transmits a value of the parameter meeting the selected job condition item.

According to this example, the host server 4 can return the job condition item information of the external database 5 before transmitting external parameters in response to the external parameter request, and whereby it is possible for the client to select the job condition item. Thus, this further ensures that external parameters are delivered.

Further, in order to keep preferable the operability of external parameter delivery by the client, the client machine 2 preferably comprises a job condition item information display section for displaying the job condition item information of the external database 5 transmitted from the host server 4 so as to be selectable.

While external parameters to be delivered may be those that do not consider the use conditions of the image forming apparatus 1, from the viewpoint of securing delivery of the performance of the image forming apparatus 1, such parameters preferably consider the use conditions of the image forming apparatus 1. The "use conditions of the image forming apparatus 1" here refers to environmental conditions such as temperature and humidity.

As a representative example of this type is preferably such that the host server 4 retrieves the value of the parameter meeting the job condition from the external database 5 based on use condition of the image forming apparatus 1.

Here, "based on the use condition of the image forming apparatus 1" is not limited that the values of the parameter corresponding to the use conditions are stored in the external database 5 itself, but may include that the value of the parameter is corrected depending on the use conditions of the image forming apparatus 1.

It may possible to make correction according to the use conditions of the image forming apparatus 1 on the client server 3, not on the host server 4.

The supply timing of various parameters delivered from the host server 4 to the image forming apparatus 1 may be selected appropriately. As a representative example, the client server 3 transmits the value of the parameter transmitted from the host server 4 to the image forming apparatus 1 before the image forming apparatus 1 starts a job.

Further, starting the job by the image forming apparatus 1 may be selected appropriately as long as the job is started by the image forming apparatus 1 after various parameters of the image forming apparatus 1 have been set, as a representative example, after the client server 3 transmits the value of the parameter transmitted from the host server 4 to the image forming apparatus 1, the image forming apparatus 1 automatically starts a job according to the job instruction from the client machine 2.

According to this example, by automatically starting a job via the image forming apparatus 1 after external parameters have been set, a separate operation for starting a job via the image forming apparatus 1 is made unnecessary thus simplifying the operation.

In order to upgrade the reliability of delivery of external parameters, it is preferable to add a feature for checking whether external parameters have been delivered properly. For example, if the host server 4 has transmitted the value of the parameter to the image forming apparatus 1 via the client server 3, the host server 4 can receive job result information from the image forming apparatus 1 via the client server 3.

In this practice, if the host server 4 comprises an analysis feature for analyzing the job result information, it is possible to determine whether proper external parameters have been delivered.

In particular, in order to construct a system for printer as image forming apparatus 1 in this invention, it is preferable that the external database 5 stores the plurality of values of the parameter so that at least the values correspond to brands of print sheets, respectively.

This is because the user often selects the print sheets based on the brand of the print sheets, and it is easy to set parameters specialized in the brand of print sheets.

The job condition item of the external database 5 may be the manufacturer of the print sheets, basis weight as well as the brand of sheets, or these three factors together.

From the viewpoint of upgrading reliability of delivery of parameters from the host server 4 in the image forming apparatus management system, it is preferable that the printer, which is as the image forming apparatus 1, has an image information measuring section adapted to measure an image information on result of the print job; and the printer transmits the image information to the host server via the client server.

BRIEF DESCRIPTION OF THE DRAWINGS

FIG. 14 is an explanatory drawing showing a specific example of an external database according to the embodiment 1.

FIG. 16 is an explanatory drawing showing outline of image forming apparatus management system according to an embodiment 2.

FIG. 17 is an explanatory drawing showing outline of image forming apparatus management system according to an embodiment 3.

DETAILED DESCRIPTION OF THE PREFERRED EMBODIMENTS

The invention will be given in detail on a basis of embodiments shown in the attached drawings.

Embodiment 1

Figure 1:
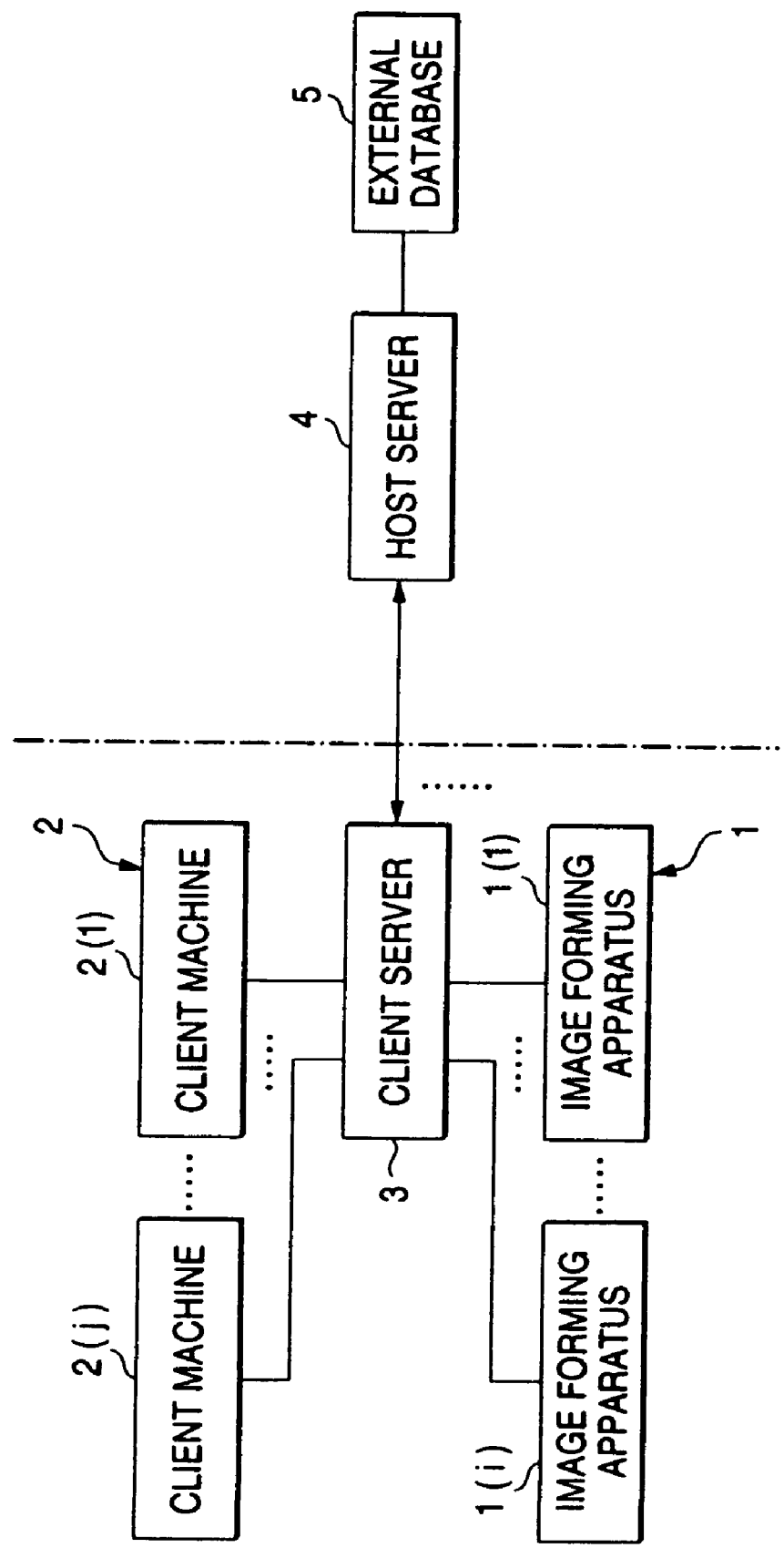
FIG. 1 is an explanatory drawing showing outline of an image forming apparatus management system according to the invention.
Figure 2:
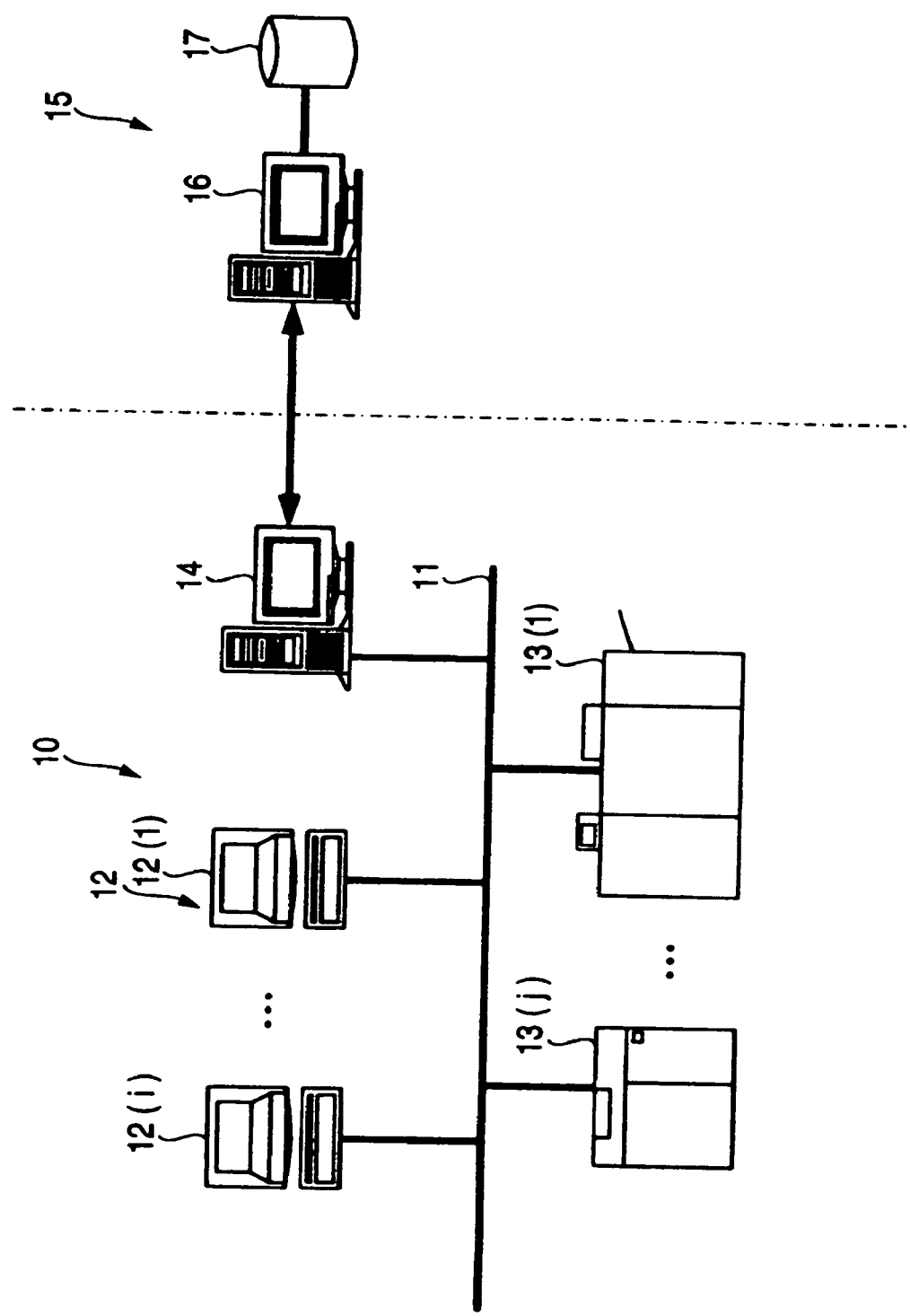
FIG. 2 is an explanatory drawing showing the entire configuration of the image forming apparatus management system according to the embodiment 1.

FIG. 2 is an explanatory drawing showing an image forming apparatus management system according to an embodiment 1 to which the invention is applied.

In FIG. 2, a reference numeral 10 denotes a user environment, for example, in LAN (Local Area Network) environment. The user environment 10 comprises a plurality of client machines 12 (12(l)–12(i)), a plurality of image forming apparatus 13 (13(1)–13(j)), and a client server 14 mutually connected with each other via a network 11.

The client machine 12 is, for example, a PC or workstation. A print job instruction from the client machine 12 is transmitted to a predetermined image forming apparatus 13 via a client server 14.

A reference numeral 15 denotes a maker environment. The maker environment 15 comprises a host server 16, to which a storage device 17 such as a hard disk is connected.

In this embodiment, the host server 16 is connected to the user environment, for example, via an internet or public circuit.

Figure 3:
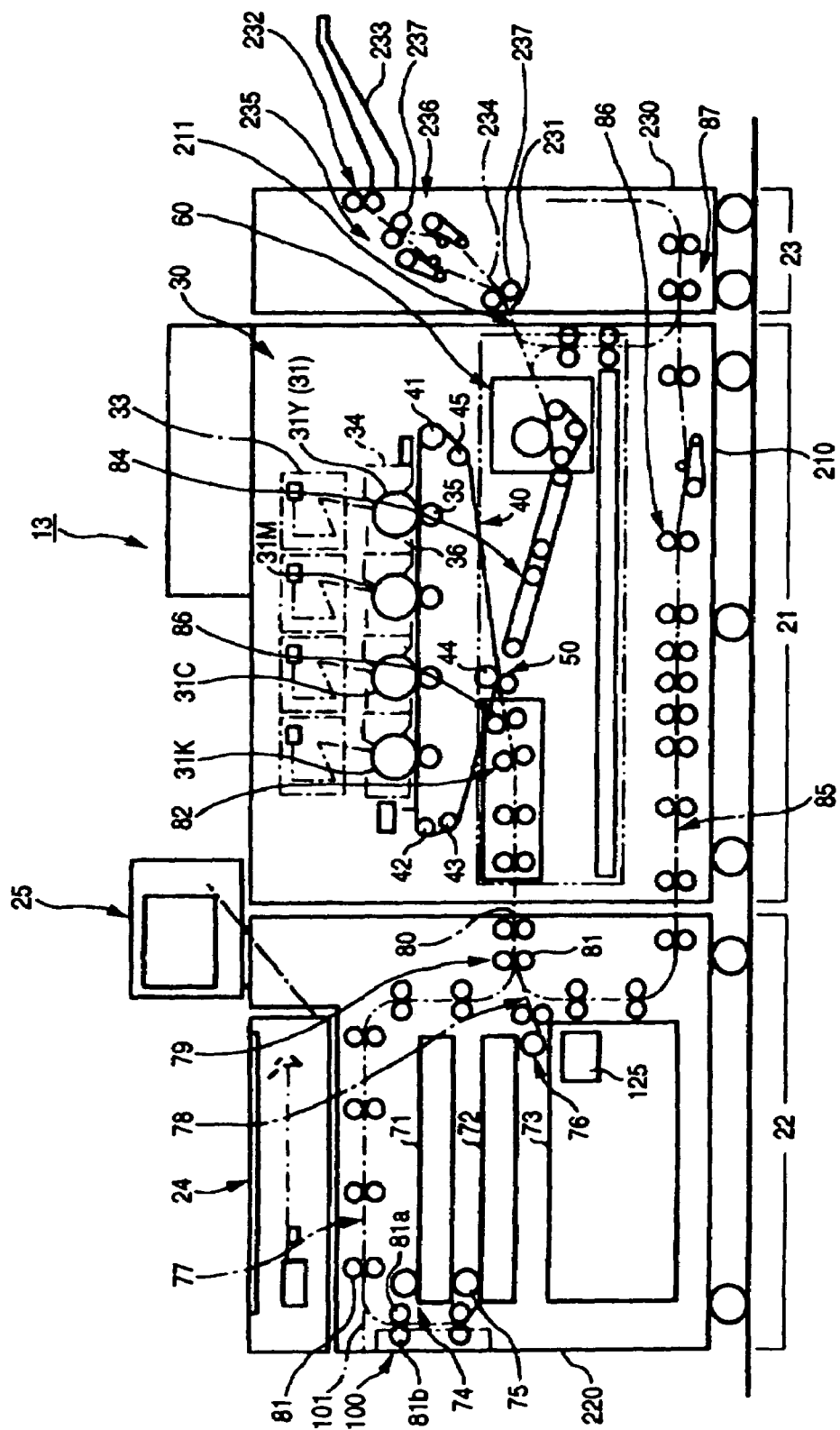
FIG. 3 is an e explanatory drawing showing an example of the image forming apparatus used according to the embodiment 1.

An example of the image forming apparatus 13 used in this embodiment (for example, the image forming apparatus 13(1) in FIG. 2) is an image forming apparatus shown in FIG. 3.

In FIG. 3, the image forming apparatus 13 according to this embodiment is so-called tandem-type image forming apparatus that employs intermediate transfer system and comprises an image forming unit 21 containing an image creating module 30, a sheet supply unit 22 arranged in parallel with the image forming unit 21 for supplying paper (not shown) as recording sheets to the image forming unit 21, and a postprocessor unit 23 arranged in parallel with the image forming unit 21 for performing postprocessing on paper where an image is formed by the image forming unit 21.

In this embodiment, the image forming unit 21 contains the image creating module 30 for forming toner images of each color component (for example, Yellow(Y), Magenta (M), Cyan(C) and Black(B)) by electrophotography. The image creating module 30 arranges, in parallel, photo conductor drums 31 (specifically, 31Y, 31M, 31C, 31K) for forming and carrying toner images of each color component. The image creating module 30 sequentially performs primary transfer of the toner images of each color component onto an intermediate transfer belt 40, and performs secondary transfer of the toner images of each color component on the intermediate transfer belt 40 onto paper supplied from the sheet supply unit 22, and then guides the toner images to a fuser 60.

In this embodiment, around each photo conductor drum 31 are sequentially arranged electronic photo devices such as a uniform charger (not shown) for charging the photo conductor drum 31, laser exposure apparatus 33 for writing an electrostatic latent image on the photo conductor drum 31, development apparatus 34 accommodating toners of each color components for visualizing the electrostatic latent image on the photo conductor drum 31, a primary transfer roll 35 for transferring toner images of each color component on the photo conductor drum 31 onto the intermediate transfer belt 40, and a cleaner 36 for removing residual toner on the photo conductor drum 31.

The intermediate transfer belt 40 is cyclically conveyed across a plurality of (five in this example) catenary rolls 41 through 45. For example the catenary roll 41 is used as a driving roll and the other catenary rolls 42 through 45 as driven rolls, and an arbitrary catenary roll among the catenary rolls 42 through 45, for example a catenary roll 43, serves as a tension roll to give tension to the intermediate transfer belt 40.

In this embodiment, a section of the intermediate transfer belt 40 opposing the catenary roll 44 is set as a secondary transfer section. On the secondary transfer section surface of the intermediate transfer belt 40 is arranged in contact with a secondary transfer roll 50 as secondary transfer apparatus. A transfer bias is applied between the secondary transfer apparatus 50 and the opposing catenary roll 44 (serving as a backup roll).

Further, in this embodiment, the sheet supply unit 22 has multi-shelf (three-shelf in this example) sheet supply trays 71 through 73. While paper consisting of plain paper of different sizes are accommodated in the sheet supply trays 71, 72, special paper such as paper with including paper with high bending strength such as coated paper, card board, and the like, and OHP sheet are accommodated in the large-capacity sheet supply tray 73 in the lowest shelf.

In particular, in this embodiment, the sheet supply trays 71, 72 have pickup rolls 74, 75 for picking up a sheet of paper on the opposite side of the image forming unit 21. The sheet supply tray 73 has a pickup roll 76 on the side of the image forming unit 21.

A sheet carrying route from the sheet supply trays 71, 72 is composed as an detoured carrying route 77 that runs from lateral side of the sheet supply unit opposite to the image forming unit 21 to upward and is directed to the image forming unit 21 by utilizing an upper space, and then to downward.

A sheet carrying route from the sheet supply tray 73 is composed as a direct carrying route 78 that extends approximately linearly toward the image forming unit 21. The direct carrying route 78 and said detoured carrying route 77 are coupled to a combined carrying route 79 to deliver paper to the image forming unit 21 via an outlet 80.

Further, the detoured carrying route 77, direct carrying route 78, and combined carrying route 79 are provided with a plurality of carrying rolls 81 at predetermined intervals.

Especially, the section located opposite to the image forming unit 21 in the unit case 220 of the sheet supply unit 22 is provided with a cover 100 that opens/closes facing the detoured carrying route 77.

The cover 100 rotates, for example, about inner section of the unit case 220 and rotatably supports a driven roll 81b of the carrying roll pair 81 (81a, 81b), and arranges the driving roll 81a and the driven roll 81b of the carrying roll 81 in separate locations when the cover 100 is open.

In this embodiment, on the horizontal carrying route section of the detoured carrying route 77 of the sheet supply unit 22 is formed a connecting carrying route 101 that extends horizontally toward the rear of the image forming unit 21. The connecting carrying route 101 works as a carrying route that receives paper supplied from another sheet supply unit and guides the paper to the detoured carrying route 77 in an aspect where for example, another sheet supply unit (not shown) is arranged adjacent to the sheet supply unit 22, or as a manual paper feed section of the sheet supply unit 22.

Further, in this embodiment, above the sheet supply unit 22 is arranged an image read unit 24 and a user operation section 25.

The image read unit 24 optically reads an image of a manuscript placed on a manuscript stand, and is composed of, for example, a light source, a reflective mirror, an imaging lens, a CCD sensor, and the like.

In this embodiment, a postprocessor unit 23 has an inlet opening 231 at a position corresponding to the ejection port 211 opened in the unit case 210 of the image forming unit 21, and on the other hand, an outlet opening 232 at a position on the opposite side to the image forming unit 21.

In this example, the inlet opening 231 is provided at a predetermined position in the lower section of the postprocessor unit 23 (below half of the height of the postprocessor unit 23). The outlet opening 232 is provided at a predetermined position in the upper section of the postprocessor unit 23 (above half of the height of the postprocessor unit 23). A sheet ejection tray 233 is attached to the unit case 230 corresponding to the outlet opening 232.

a slanted carrying route 234 is provided between the inlet opening 231 and the outlet opening 232, and the slanted carrying route 234 branches to two routes. Curl correction units 235, 236 for up-curl correction and down-curl correction, respectively, are provided on each branched carrying route.

The slanted carrying route are provided an appropriate number of carrying roll pairs 237.

The sheet carrying route within the image forming unit 21 comprises a route for reversing the paper delivered from the fuser 60 and returning the paper to the secondary transfer section again, as well as a route for guiding the paper supplied from the sheet supply unit 22 to the secondary transfer section, and then ejecting the paper to the postprocessing unit 23 via the fuser 60.

In this embodiment, the sheet carrying system arranged upstream of the secondary transfer section, as shown in FIGS. 3 and 4, receives paper P supplied from said sheet supply unit 22 to the image forming unit 21, aligns the side edge of paper P with the side initial position via skewed rolls 82 (82a–82c) composed of a plurality of (for example three) pairs, carries the paper P to the secondary transfer section while aligned with the reference position via a registration roll pair 83 arranged before the secondary transfer section, then carries the paper P that passed the secondary transfer section to the fuser 60 for example via a carrying belt 84.

In this embodiment, the sheet carrying system comprises a sheet carrying unit 88 that contains as a unit the registration roll pair 83 and the plurality of (in this example three) skewed rolls 82 arranged upstream thereof.

The sheet carrying unit 88 has guide shoots (not shown) above and below it for guiding and carrying paper and erects a fixed planar side guide 881 in one of the directions orthogonal to the sheet carrying direction and sets the inner surface of the fixed side guide 881 as a side initial position with which side edge of paper is initially aligned.

Figure 4A:
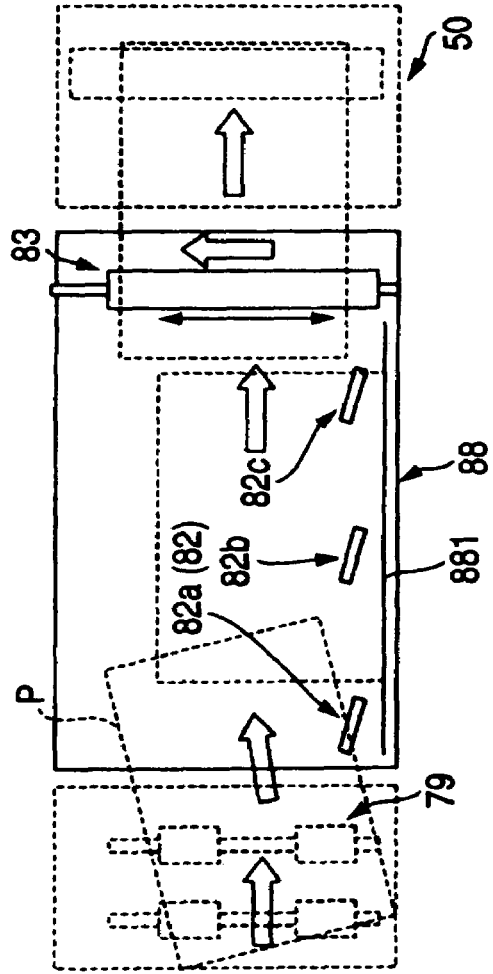
FIG. 4A is an explanatory plan view showing a front side of a secondary transfer section of sheet carrying apparatus used in the embodiment 1.
Figure 4B:
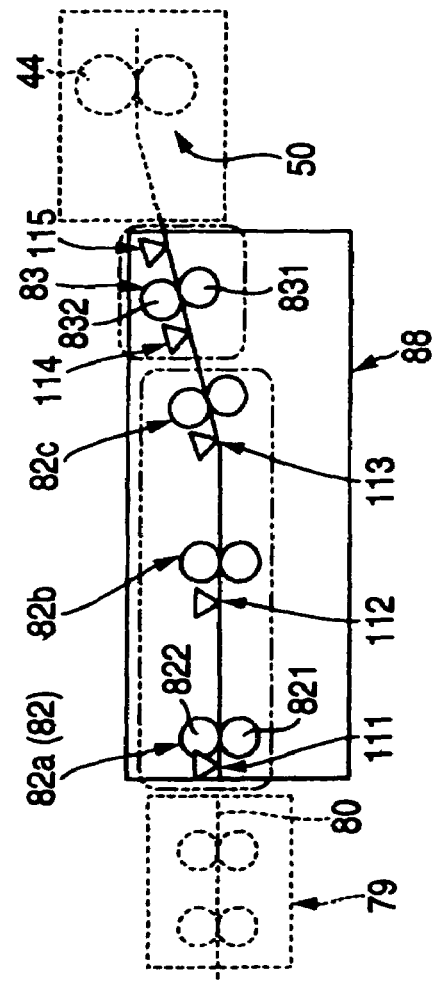
FIG. 4B is a front explanatory view of FIG. 4A.

The skewed roll 82, as shown in FIGS. 4A and 4B, is slightly slanted toward said fixed side guide 881 at the tip against the carrying direction of paper P and is composed of a drive skewed roll 821 driven to be rotated by a driving motor (not shown) composed of a pulse motor and an idle skewed roll 822 arranged under pressure therewith to rotate following said drive skewed roll 821. A Nip/Release mechanism (see FIG. 5) is provided to allow for example the idle skewed roll 822 to nip or release the drive skewed roll 821.

As shown in FIG. 4B, pass sensors 111 through 113 for detecting the paper pass timing are arranged before the inlet of each skewed roll 82 (82a through 82c).

The registration roll 83, as shown in FIGS. 4A and 4B, is composed of a drive registration roll 831 driven to be rotated by a registration driving motor (not shown) composed of for example a pulse motor and an idle registration roll 832 arranged under pressure therewith to rotate following said drive registration roll 831. A Nip/Release motor (not shown) is provided to allow for example the idle registration roll 832 to nip or release the drive registration roll 831.

Further, the registration roll 83 (831, 832) is, as shown in FIG. 4A, rotatably supported while movably in the axis direction on the frame of the sheet carrying unit 88. At one end of the support axis of the drive registration roll 831 is provided a side shift mechanism (not shown) via coupling.

Further, before and after the nip section of the registration roll 83 are arranged a registration-in sensor 114 and a registration-out sensor 115 for detecting the paper pass timing.

The sheet return mechanism used in this embodiment carries paper delivered from the fuser 60 via an appropriate number of carrying rolls 86 along the loop-shaped return route 85. The sheet return mechanism provides a reversal section (composed in the lower space in the postprocessing unit 23 in this example) at some midpoint in the return route 85, via which reversal section 87 paper is reversed.

In particular, an image forming apparatus according to this embodiment is provided with various parameter adjustment apparatuses for creating high-accuracy images.

Parameter adjustment apparatuses of this type include, for example, means for pressure adjustment by the skewed roll 82 as a bias correction element of paper, air volume adjustment by an air blower 125 provided on the sheet supply tray 73 used to separate a sheet of paper from paper stack, adjustment of voltage applied to the secondary transfer section (secondary transfer roll 50) to upgrade reproduction of image quality, adjustment of curl correction amount via curl correction unit 235, 236 for printed paper, adjustment of image creating conditions for an image creating device such as potential setting/adjustment on the photo conductor drums 31, and adjustment of fusing conditions for the fuser 60. In this embodiment, three examples of parameter adjustment apparatus, namely, adjustment of pressure of the skewed roll 82, adjustment of air volume of the air blower 125, and adjustment of voltage applied to the secondary transfer section will be described below.

Figure 5A:
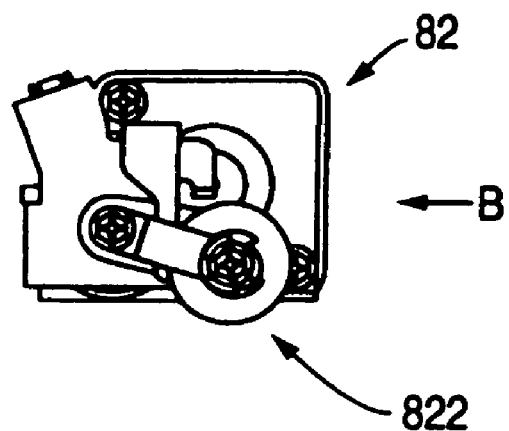
FIG. 5A is an explanatory drawing showing a support structure of a skewed roll used in the embodiment 1.
Figure 5B:
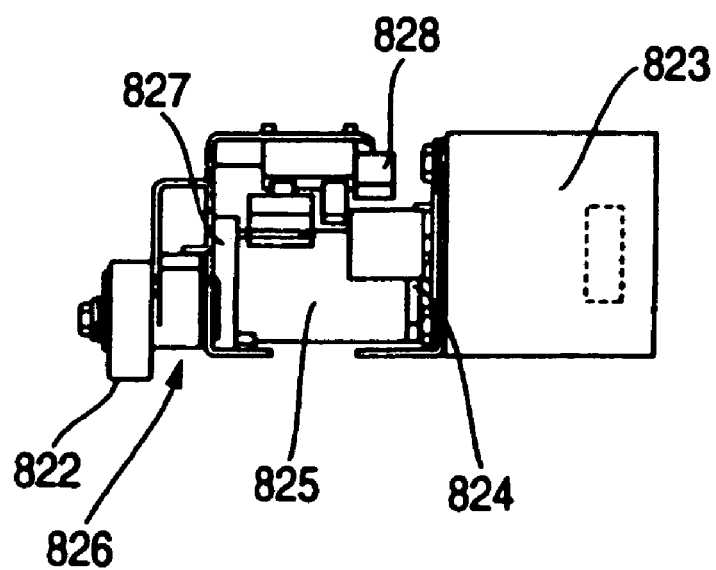
FIG. 5B is a drawing seen from direction B in FIG. 5A.

Means for adjusting pressure of the skewed roll 82 as parameter adjustment apparatus used in this embodiment is implemented as follows:

In this embodiment, the Nip/Release mechanism of the idle skewed roll 822, as shown in FIGS. 5A and 5B, fixes a gear for motor 824 onto the shaft of the Nip/Release (N/R) motor 823, attach an arm 827 to the gear for motor 824 via a one-way clutch 825 (for example an aspect where a torque limiter is provided between a pair or clutch plates and a gear engaging with the gear for motor 824 is provided on one of the clutch plates), as well as winds a torsion spring 826 around the arm 827, on tip of which is attached rotatably an idle skewed roll 822. A numeral 828 in FIG. 5 is a home sensor for detecting the home position of the gear for the one-way clutch 825, and the drive skewed roll is not shown.

In such a Nip/Release mechanism, nip operation of the skewed roll 82 is as follows:

The Nip/Release mechanism uses the ON signal of each pass sensor 111 through 113 (detection of tip of paper passing through the pass sensor position) to start nip operation and the Nip/Release motor 823 starts to rotate.

Rotation of the Nip/Release motor 823 is transmitted to the arm 827 via the gear for motor 824, gear for the one-way clutch 825 and the torsion spring 826.

In this practice, from the home position of the gear for the one-way clutch 825 to the position where the idle skewed roll 822 nips the drive skewed roll 821, both said gear and the arm 827 rotate.

When Nip/Release motor 823 further rotates after the idle skewed roll 822 has nipped the drive skewed roll 821, the arm 827 cannot rotate so that the gear for the one-way clutch 825 rotates while contracting the torsion spring 826. In this case, the shaft integrated with the arm 827 and the gear for the one-way clutch 825 rotates relatively in a sliding fashion.

In this way, the spring force via the torsion spring 826 contracted by the gear for one-way clutch 825 is transmitted to the arm 827, and works as a nip pressure of the skewed roll 82.

Thus, by retaining the position of the gear for motor 824 via the Nip/Release motor 823 to a set position, it is possible to obtain desired nip pressure of the skewed roll 82.

Figure 6:
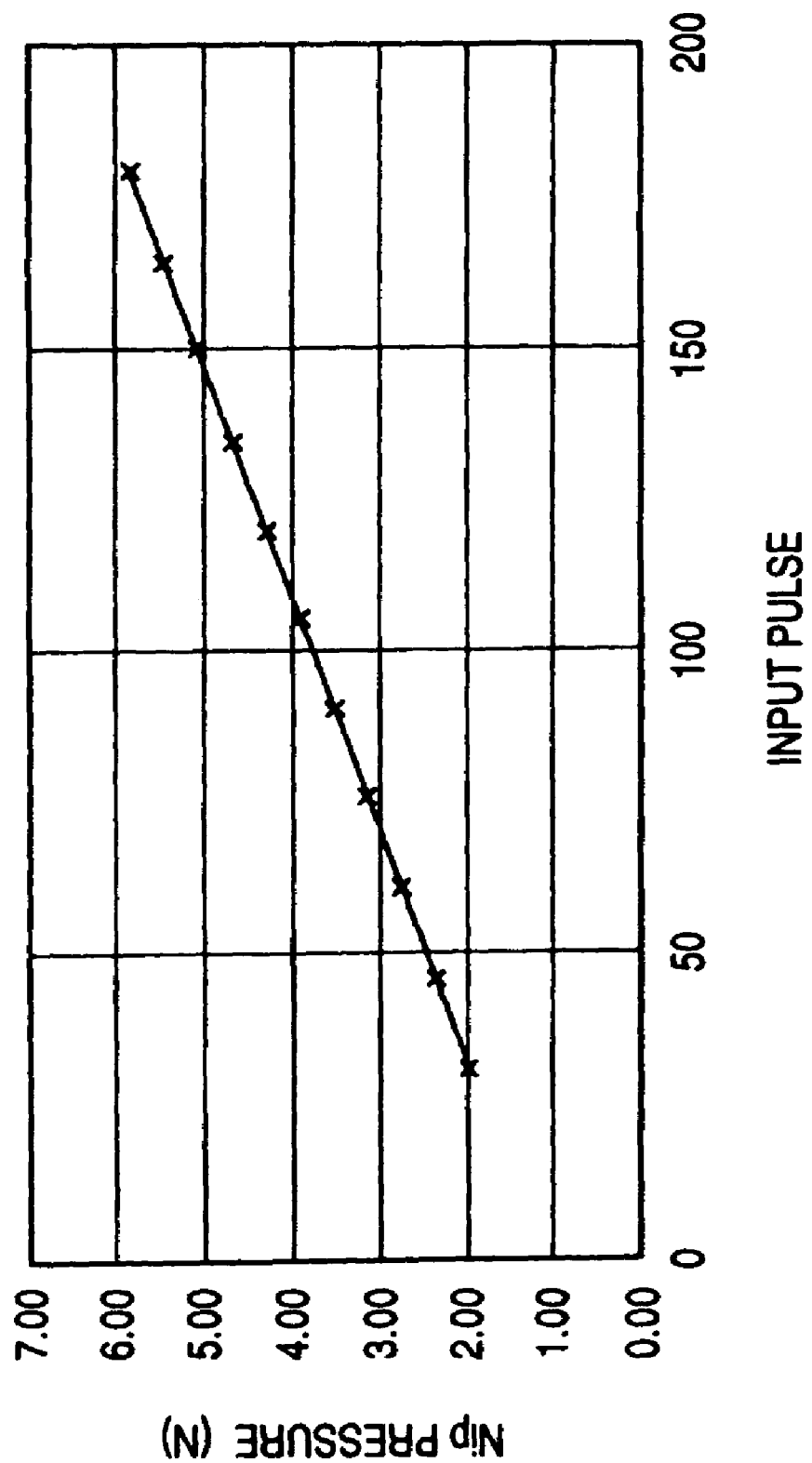
FIG. 6 is an explanatory drawing showing relationship between nip pressure and input pulse of the skewed roll in the embodiment 1.

In this embodiment, the nip pressure the skewed roll 82 is, as shown in FIG. 6, set in proportional to the input purse to the Nip/Release motor 823.

Release operation of the skewed roll 82 is as follows in the aforementioned the Nip/Release mechanism:

The Nip/Release mechanism uses the ON signal of the registration-out sensor 115 (detection of tip of paper passing through the registration-out sensor 115 position) to start nip operation and the Nip/Release motor 823 starts to rotate in reverse direction.

Rotation of the Nip/Release motor 823 is transmitted to the gear for motor 824, the one-way clutch 825 and the arm 827 in this order. In this state, the one-way arm is locked so that the arm 827 is raised and the idle skewed roll 822 is placed apart from the drive skewed roll 821, and release operation of the skewed roll terminates.

In this embodiment, however, the Nip/Release motor 823 continues rotating in order to provide for next nip operation.

In this state, the arm 827 remain stopped at the stopped (not shown) while the Nip/Release motor 823 is rotating. The one-way clutch 825 is locked so that the torque limiter slides.

When the home sensor 828 detects the home position of the gear for the one-way clutch 825, the Nip/Release motor 823 stops rotation.

Figure 7A:
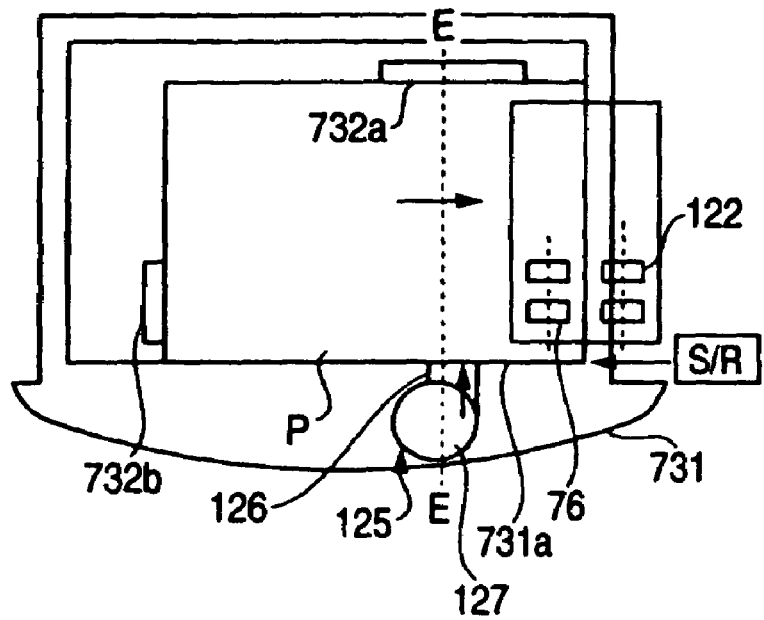
FIG. 7A is an explanatory plan view showing outline of sheet supply apparatus 730 used in the embodiment 1.
Figure 7B:
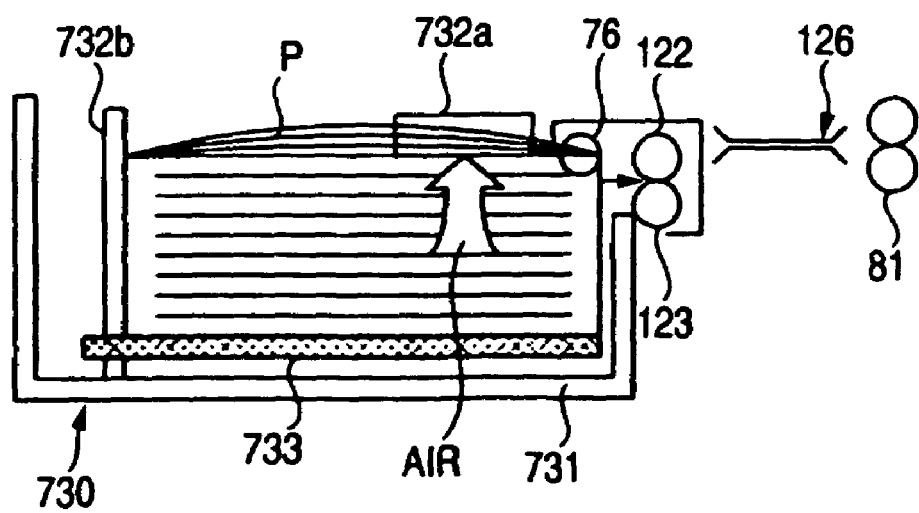
FIG. 7B is a front explanatory view of FIG. 7A.

Air volume adjustment is made via air blower 125 as parameter adjustment apparatus used in this embodiment. The air blower is implemented as follows:

In this embodiment, the sheet supply tray 73 comprises, as shown in FIGS. 7A and 7B, a box-shaped sheet tray 731 for accommodating various paper P, a sheet guide 732 (specifically 732*a*, 732*b*) for restricting the position of paper P accommodated in the sheet tray 731, and a bottom plate 733 arranged at the bottom of the sheet tray 731 for elevating the paper P up to the supply position.

In this embodiment, paper P in the sheet tray 731 is accommodated while abutting the frontward wall positioned in the sheet supply direction and the position fixing wall 731*a* of the adjacent side wall. The sheet guide 732 consists of a side guide 732*a* for restricting the side edge (side) position in the direction orthogonal to the direction of supply of paper P in the sheet tray 731 and an end guide 732*b* for restricting the trailing edge (end) position in the direction of supply of paper P in the sheet tray 731. In this example, the side wall section of the position fixing wall 731*a* serves as side/registration (side reference position) S/R.

In the frontward section in the sheet supply direction of the sheet tray 731 is arranged a pickup roll 76 for picking up a sheet of paper P in the sheet tray 731. In this example, the pickup roll 76 rocks via a support arm (not shown) to abut the upper face of the paper P that is elevates. In the near proximity of the support arm is provided a height sensor (not shown), which detects the height dimension of the stock of paper P by detecting the rocking of the support arm.

Further, in the downstream of the pickup roll 76, a supply roll 1222 that rotates in the sheet supply direction comes in contact, under a predetermined pressure, with a retard roll 123 rotatable in both directions while a certain torque is applied vi a torque limiter (not shown) in the direction opposite to the sheet supply direction. The interaction of the rolls is used to separate and carry the paper P.

The retard roll 123 is driven to rotate in the direction opposite to the sheet supply direction. When only a sheet of paper P is present at the contact with the supply roll 122, the retard roll 123 rotates in the sheet supply direction, and when two or more sheets of paper P are present, the retard roll 123 rotates in the direction opposite to the sheet supply direction.

Especially, in this embodiment, on one side of the sheet tray 731 is provided the air blower 125, which floats and separates paper P by blowing air sideways onto the paper P accommodated in the sheet tray 731.

The air blower 125 opens an air outlet in one side wall of the sheet tray 731 as shown in FIG. 7 (the position fixing wall 731*a* section in this example). To this air outlet is connected an air duct 126, to which a fan unit 127 incorporating fan is attached.

While the opening position of the air outlet is in one of the lateral directions in this embodiment, it may be in one of the forward, backward, and lateral directions. The opening width of the air outlet may be part of the side of paper P or along the whole length of side of Paper P. The air outlet may be singular or plural. The fan may b an axial-flow fan, a sirocco fan, or a cross-flow fan.

In this embodiment, adjustment of an voltage applied to the second transfer roll 50 is made by variably setting the applied voltage as required for the transfer bias power source which is not shown.

The image forming apparatus management system is constructed as shown in FIG. 2 in this embodiment. An exemplary configuration of the client machine 12, the image forming apparatus 13, the client server 14 and the host server 16 is shown in FIG. 8.

Figure 8:
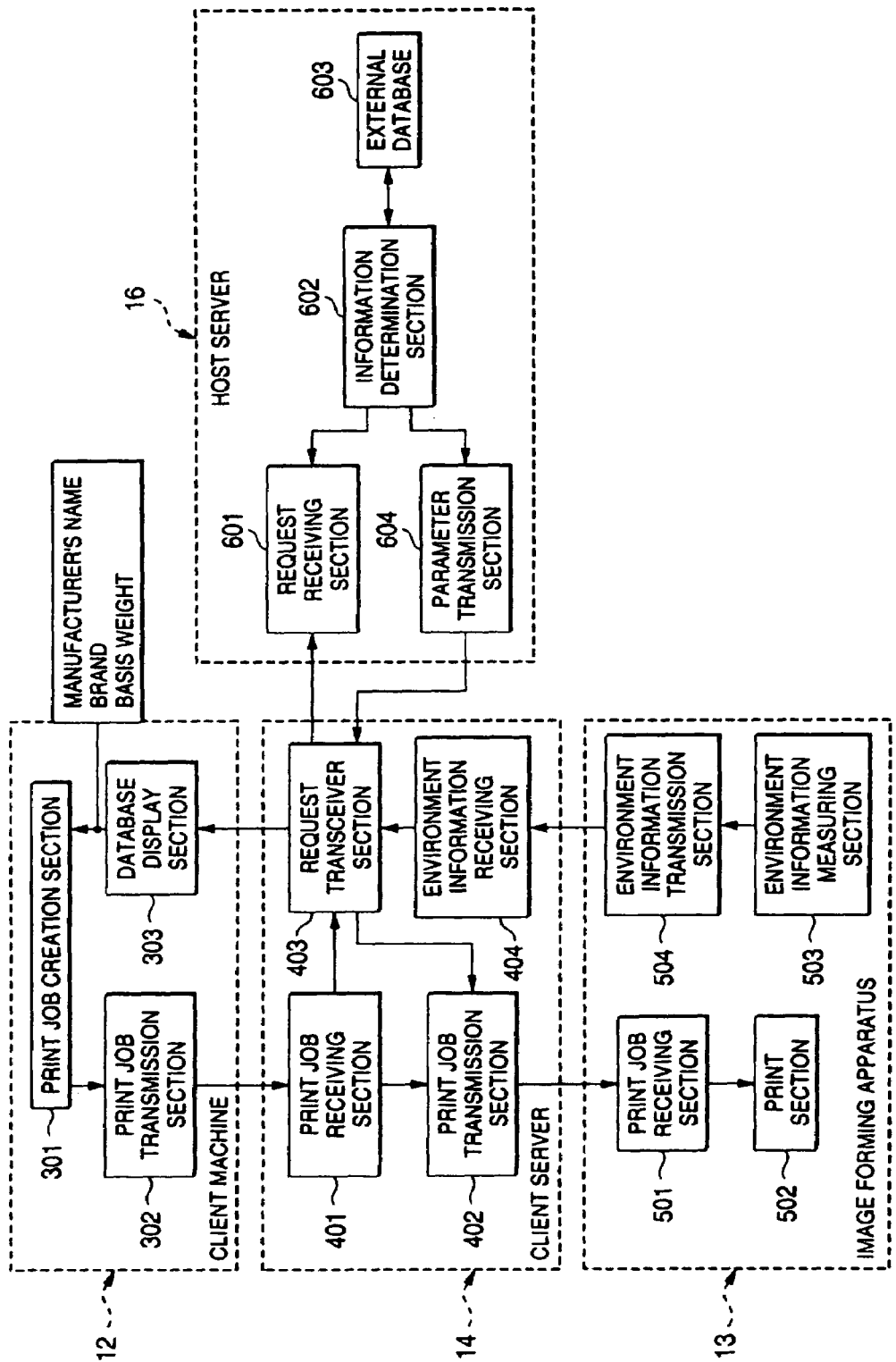
FIG. 8 is an explanatory drawing showing outline of image forming apparatus management system according to the embodiment 1.

In FIG. 8, the client machine 12 comprises a print job creation section 301, a print job transmission section 302, and a database display section 303.

The print job creation section 301 is a functional section that creates a print job having a document and a print job instruction (type of image [color or monochrome], paper size, number of copies, paper type) for instructing how this document should be printed.

The print job transmission section 302 is a functional section that transmits a created print job or a print job under creation to the client server 14.

The database display section 303 is a functional section that displays items for selecting external parameters stored in an external database described later (in this example, manufacturer of paper, brand of paper and basis weight of paper). The print job creation section 301 can take appropriate items displayed on the database display section 303 into a print job instruction.

The image forming apparatus 13 comprises a print job receiving section 501, a print section 502, an environment information measuring section 503, and an environment information transmission section 504.

Here, the print job receiving section 501 is a functional section that receives a print job transmitted from the client server 14.

The print section 502 refers to a series of functional sections that create an image on paper and eject the paper. For example, the print section 502 refers to an image forming unit 21, a sheet supply unit 22 and a postprocessing unit 23 in the image forming apparatus 13 shown in FIG. 3.

Further, the environment information measuring section 503 is a functional section that measures environment information of the print section 502 (such as temperature and humidity), and comprises, for example, a temperature sensor and a humidity sensor.

Moreover, the environment information transmission section 504 is a functional section that transmits environment information measured by the environment information measuring section 503 to the client server 14.

The client server 14 comprises a print job receiving section 401, a print job transmission section 402, a request transceiver section 403 and an environment information receiving section 404.

The print job receiving section 401 is a functional section that receives the print job or the print job under creation transmitted from the client machine 12.

The print job transmission section 402 is a functional section that transmits the print job from the print job receiving section 401 and the request transceiver section 403 to the image forming apparatus 13.

The request transceiver section 403 makes an external parameter request to host server 16 according to an instruction from the print job receiving section 401, receives external parameter selection items from the host server 16 as required, and receives external parameters corresponding to the selected items.

Further, in case that the request transceiver section 403 receives the external parameter selection items from the host server 16 or in case that even if the request transceiver section 403 does not receive, there is any external parameter selection items stored in the client server 14, the request transceiver section 403 transmits these external parameter selection items to the database display section 303 of the client machine 12.

The environment information receiving section 404 is a functional section that receives environment information from the environment information transmission section 504. Environment information received by the environment information receiving section 404 is transmitted to the host server 16 via the request transceiver section 403.

The host server 16 comprises a request receiving section 601, an information determination section 602, an external database 603, and a parameter transmission section 604.

The request receiving section 601 is a functional section that receives a request (for example, an external parameter request) from the client server 14.

The information determination section 602 checks update time and date of the external database 603 for a request received by the request receiving section 601 and compares history of requests from the client server 14 with the update time and date of the external database 603. In case that the external database 603 has been updated after the last external parameter request, the information determination section 602 supplies external parameter selection items stored in the external database 603 to the parameter transmission section 604. Otherwise, the information determination section 602 notifies the parameter transmission section 604 that the external database 603 has not been updated.

Furtheremore, the information determination section 602 searches through the external database 603 under the conditions where the request receiving section 601 has received a selection signal for any one of the external parameter selection items from the client server 14 and has received environment information on the image forming apparatus 13. The information determination section 602 supplies the resulting optimum external parameters to the parameter transmission section 604.

The external database 603 is implemented in the storage device 17 shown in FIG. 2 and sequentially updated.

In this embodiment, as shown in FIG. 14, the external database 603 has selection items (external database selection items) including manufacturer of paper (AAAAA, BBBBB. . . ), brand (aaaaa, bbbbb. . . ), and basis weight (90 gsm, 80 gsm, . . . ), and assigns nip pressure of the skewed roll, air blower ON/OFF, and transfer voltage value for the secondary transfer roll, all of which are optimized, to each of selection items as external parameters.

In particular, in this embodiment, the external database 603 further optimizes the external parameters according to the environment information of the image forming apparatus 13 (temperature, humidity).

Optimization of the nip pressure of the skewed roll as an external parameter will be discussed as an example.

Figure 15A:
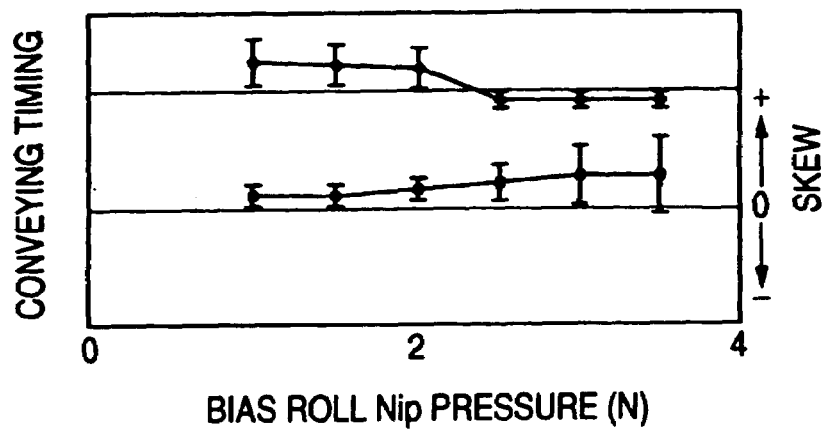
FIGS. 15A through 15C are graphs showing relationship among the nip pressure of a skewed roll, carrying timing and skew for different paper types.
Figure 15B:
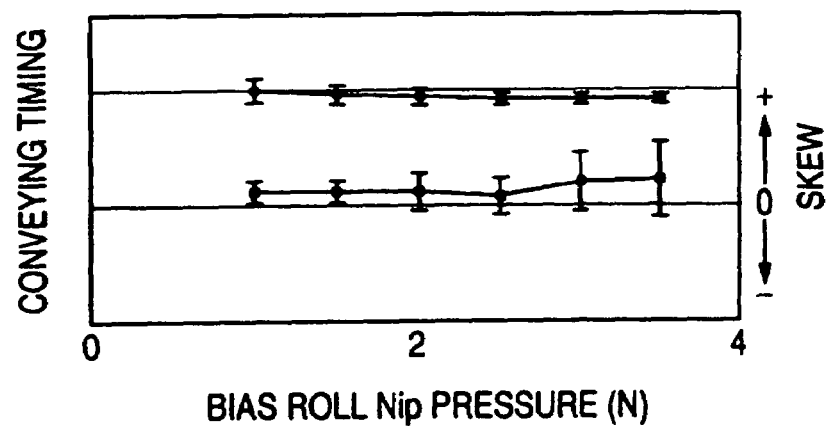
Figure 15C:
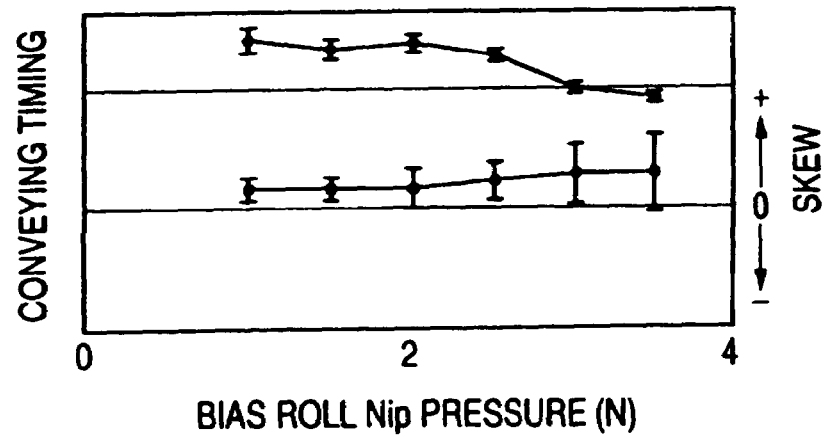

FIGS. 15A through 15C show measurements of skew amount of paper and carrying timing where paper can be carried under conditions in which the nip pressure of the skewed roll is varied. ■ in FIGS. 15A through 15C represents the skew amount, ♦ represents a carrying timing and vertical range specification in each plot point represents variations in measurement.

According to FIGS. 15A through 15C, in view of enabling the skew amount to be small and the carrying timing to be reduced a target value, getting the optimum value of the nip pressure of the skewed roll on each paper type results in a nip pressure of about 2.5 N for the paper shown in FIG. 15A, about 1.0 N for the paper shown in FIG. 15B, and about 3.0 N for the paper shown in FIG. 15C. Thus, it is possible to optimize the nip pressure of the skewed roll according to the manufacturer, brand and/or basis weight for paper shown in FIGS. 15A through 15C.

While the optimization is made by turning ON/OFF the blower per paper in this embodiment, it may be possible to make minute adjustment of the air volume to blow.

While the optimization of the transfer voltage y of the secondary transfer roll 50 is made per paper by adding a correction bias a1 through a4 to the reference transfer voltage x in this embodiment, the invention is not limited to this but selection may be made as appropriate such as changing the proportional coefficient.

The parameter transmission section 604 is a functional section that transmits the external parameter selection items and external parameters supplied from the information determination section 602 to the client server 14.

The client machine 12, the client server 14, the host server 16, and the image forming apparatus 13 perform processing shown in FIGS. 9 through 12, respectively, to complete a series of print jobs.

A series of print jobs will be described referring to the processing shown in FIGS. 9 through 12.

Assuming that, in the user environment 10 shown in FIG. 2, a client prepares a document on a client machine 12(1) and executes print jobs to print the document, for example, by image forming apparatus 13(1).

Figure 9:
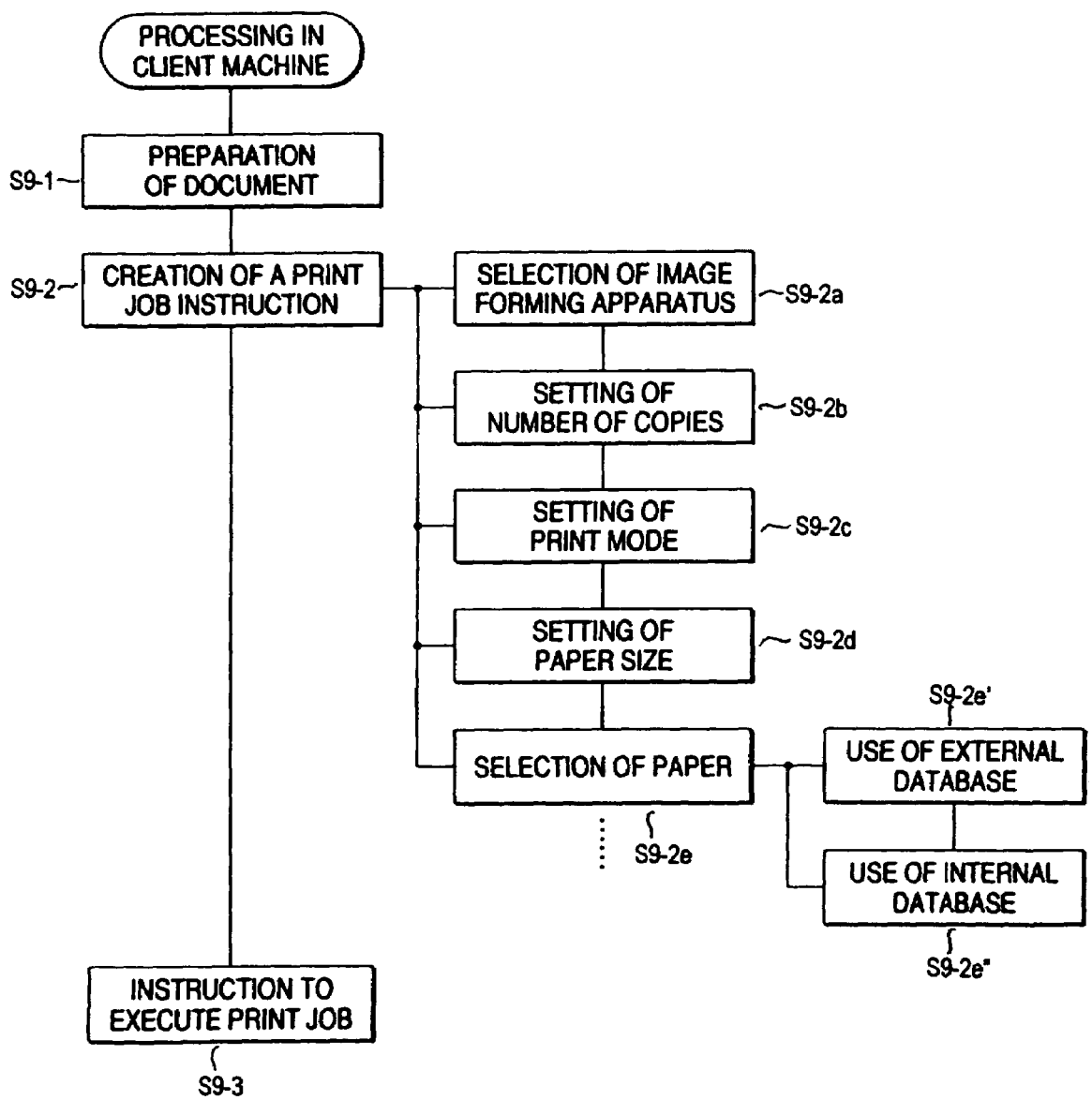
FIG. 9 is a flowchart showing processing in a client machine according to the embodiment 1.

It is necessary for the client, as shown in FIG. 9, to prepare a document on the client machine 12(1) (S9-1) and to create a print job instruction (S9-2) to make the image forming apparatus 13(1) perform print jobs (S9-3).

The print jobs may include selection of the image forming apparatus to be used (in this example, the image forming apparatus 13(1)) (S9-2a), number of copies (S9-2b), print mode setting (for example, color or monochrome) (S9-2c), paper size setting (user-specified value 321 or automatic detection 322) (S9-2d), selection of paper (S9-2e), and the like.

In particular, concerning the selection of paper (S9-2e), selecting operation is made about either to use the external database 603 (see FIG. 8;S9-2e') stored in the storage device 17 or to use an internal database (S9-2e") provided in advance (for example, built into the storage of the image forming apparatus 13 in this example) is used in the maker environment 15 shown in FIG. 2.

Figure 10:
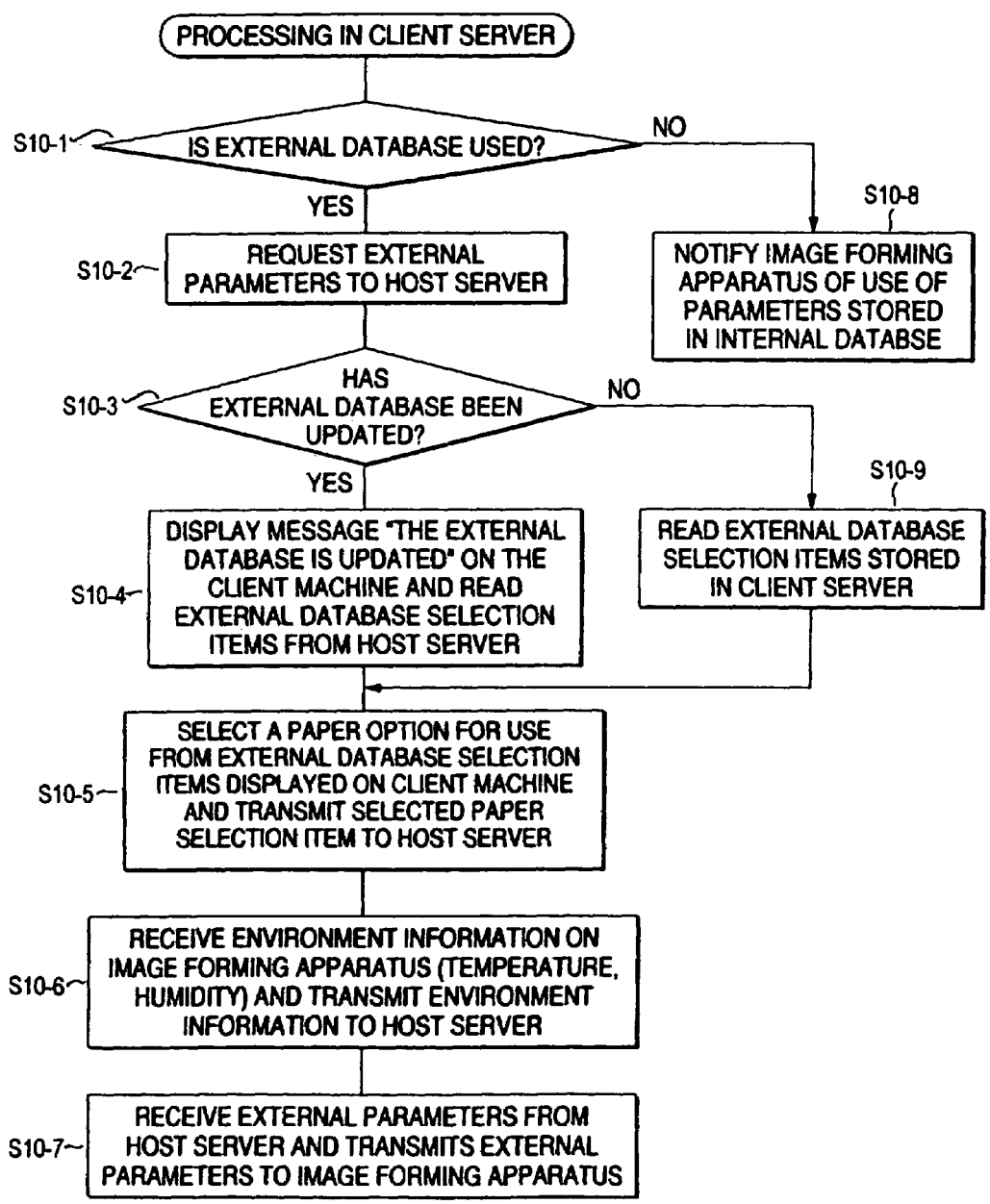
FIG. 10 is a flowchart showing processing in a client server according to the embodiment 1.
Figure 13:
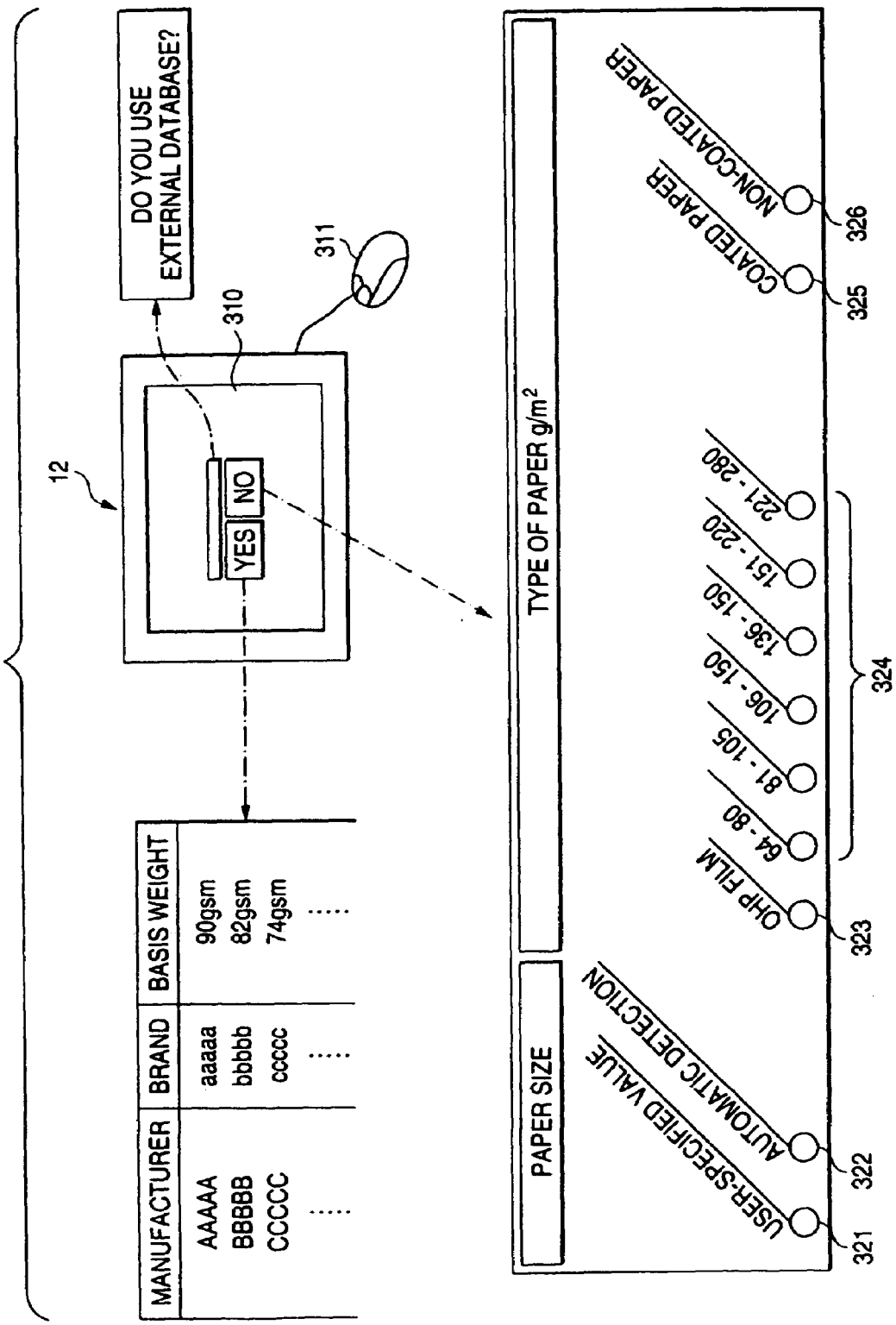
FIG. 13 is an explanatory drawing showing outline of parameter setting operation in the image forming apparatus management system according to the embodiment 1.

Assuming that the client creates a print job instruction with operation of the mouse 311 on a display screen 310 of the client machine 12 (12(1) in this example), a message "Do you wish to use an external database?" and selection items "Yes" and "No" are displayed on the display screen 310 when the client creates a paper selection instruction, for example as shown in FIG. 13 (Sb-1 in FIG. 10).

When "No" is selected at S10-1, there displays a OHP film selection button 323, a basis weight selection button for each step 324, a coated paper selection button 325, and a non-coated paper selection button 326, for example, as type of paper (S10-8). Selecting at least one of the selection buttons assumes paper selection using an internal database.

On the other hand, selecting "Yes" in response to the message "Do you wish to use an external database?" (Yes at S10-1) causes the client machine to notify the client server 14 of this selection. The client server 14, which receives this notification, requests external parameters from the host server 16 (S10-2: S11-1).

Figure 11:
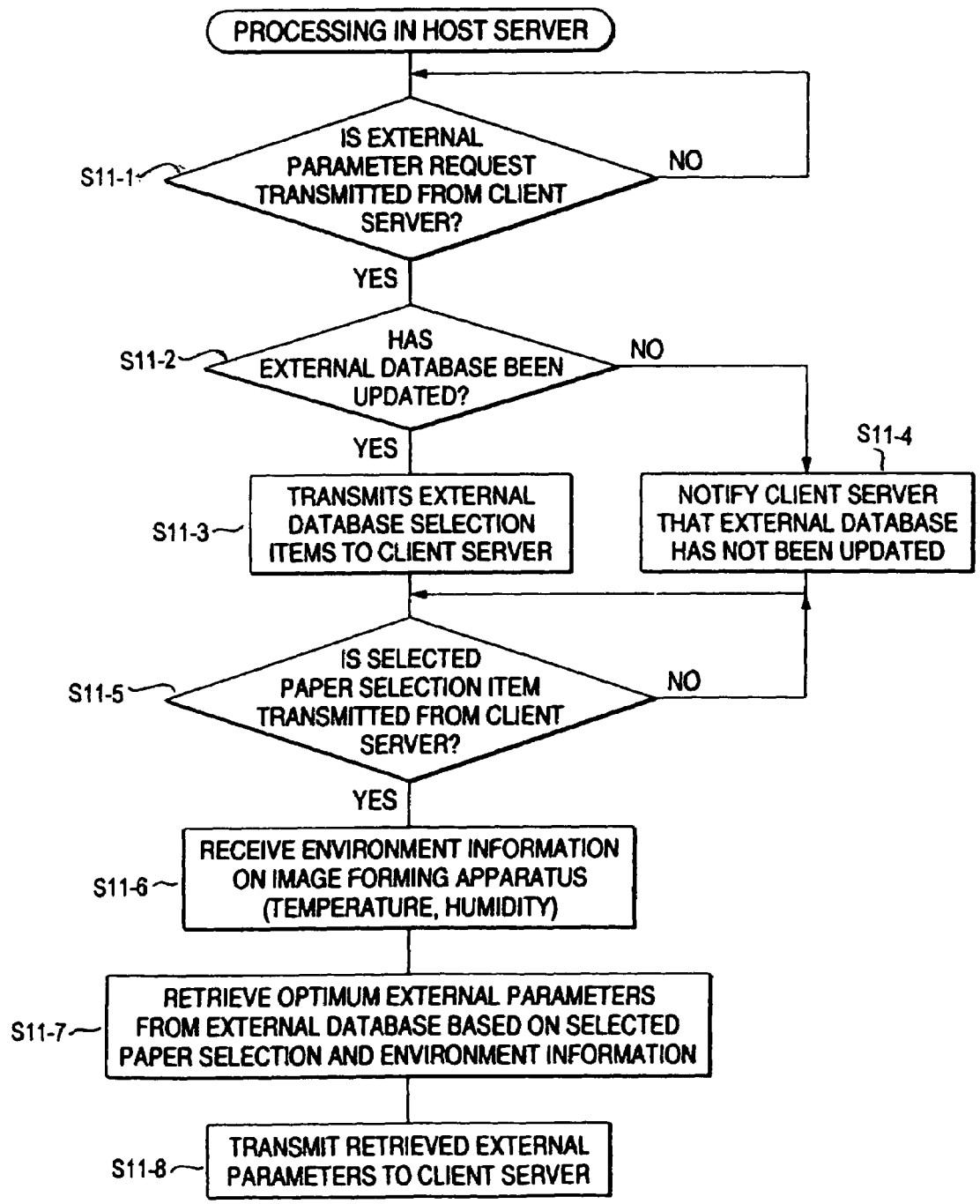
FIG. 11 is a flowchart showing processing in a host server according to the embodiment 1.
Figure 12:
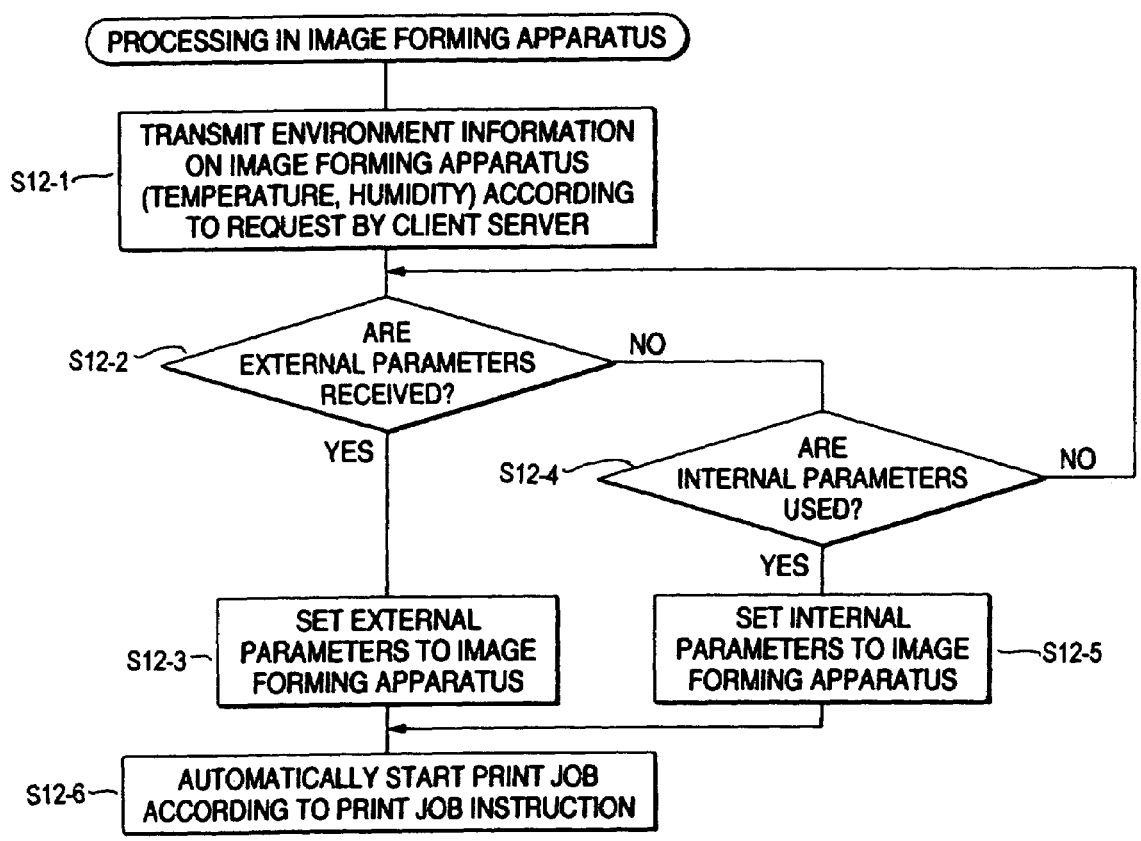
FIG. 12 is a flowchart showing processing in image forming apparatus according to the embodiment 1.

The host server 16 checks whether the external database 603 has been updated as shown in FIG. 11 (S11-2; and S10-3 in FIG. 10). In case that the external database 603 has been updated since the last external parameter request time and date by the client server 14 (Yes at S11-2), the host server 16 transmits external database selection items (manufacturer of paper, brand of paper and basis weight of paper in this example) to the client server 14 (S11-3). In case that the external database 603 has not been updated (No at S11-2), the host server 16 notifies the client server 14 that the external database 603 has not been updated (S11-4).

In case that the external database 603 has been updated (Yes at S10-3), as shown in FIG. 10, the client server 14 causes the client machine 12 to display message "The external database is updated" (S10-4). The client server 14 reads the external database selection items from the host server 16 and causes the client machine 12 to display the selection items (see FIG. 13).

In case the external database 603 has not been updated, as shown in FIG. 10, the client server 14 causes the client machine 12 to display the last external database options stored in the client server 14.

In this state, when the client selects a paper item, which the client intends to use, from the external database selection items displayed on the client machine 12, the client server 14 transmits the paper item selected to the host server 16 according to the operation instruction from the client machine 12(S10-5).

The client server 14 receives the environment information of the image forming apparatus 13 (13(1) in this example), that is, temperature and humidity, to transmit the environment information to the host server 16, for example, at a timing when the client server 14 transmits the paper item selected to the host server 16(S10-6).

When the host server 16 receives the selected paper item from the client server 14 (Yes at S11-5) and receives the environment information of the image forming apparatus 13 (13(1) in this example) from the client server 14(S11-6), the host server 16 then retrieves optimum external parameters from the external database 603 based on the selected paper item and the environment information (S11-7) and transmits the retrieved external parameters to the client server 14(S11-8).

The client server 14 receives the external parameters from the host server 16(S10-7). For example, if the client machine 12 has already issued the print job execution instruction, the client server 14 automatically transmits the external parameters to the image forming apparatus 13. When the client machine 12 issues a print job execution instruction (S9-3) in a state where the client machine 12 has issued an operation instruction to use an internal database, the client server 14 notifies the image forming apparatus 13 of the use of parameters of the internal database.

From the image forming apparatus 13 (13(1) in this example), as described above, the environment information on the image forming apparatus 13 is transmitted to the host server 16 via the client server 14 in response to a request by the client server 14 (S12-1).

The image forming apparatus management system 13 checks whether the image forming apparatus 13 has received external parameters from the client server 14(S12-2). In case that the image forming apparatus 13 has received the external parameters (Yes at S12-2), the external parameters are set to the print section 502 of the image forming apparatus 13 (for example, the nip pressure of the skewed roll 82, ON/OFF of the air blower 125, parameters concerning transfer voltage of the secondary transfer roll 50) (S12-3).

On the other hand, in case that the image forming apparatus 13 has not received the external parameters (No at S12-2) and uses internal parameters (parameters in the internal database) (Yes at S12-4), the internal parameters are set to the image forming apparatus (S12-5).

After that, the image forming apparatus 13 automatically starts the print job according to the print job instruction transmitted from the client server 14(S12-6).

In such image forming apparatus management system, in case that the external database is used, information input from the client may be the minimum information such as the brand to identify the paper. This reduces the information input by the client and prevents a problem accompanying with parameter setting such as an information input error and the like. This fulfills the maximum performance of the image forming apparatus 13.

It is possible to directly make parameter setting to individual image forming apparatus 13 from the external database 603 owned by the maker environment. This allows use of parameter set values assumed when the image forming apparatus 13 was developed. The external database 603 can be sequentially updated in the maker environment 15. Thus it is possible to always operate the image forming apparatus 13 with the latest parameters even in case that parameter set values need to be reviewed on individual image forming apparatus 13.

Embodiment 2

FIG. 16 shows an embodiment 2 of the image forming apparatus management system to which the invention is applied. In FIG. 16, basic configuration of the image forming apparatus management system is approximately the same as that of the embodiment 1. In the embodiment 2, unlike the embodiment 1, the external database 603 of the host server 16 is constructed so as not to take the environment information on the image forming apparatus 13 into account. On the other hand, a parameter correction section 405 for correcting parameters based on the environment information on the image forming apparatus 13 is added in the client server 14. In the parameter correction section 405, correction based on the environment information based is performed on the external parameters transmitted from the host server 16 or stored in the client server 14 based on the environment information. Then, the corrected external parameters are supplied to the image forming apparatus 13.

The parameter correction section 405 previously obtains relationship between various parameters and the environment information on the image forming apparatus 13 and performs correction on the external parameters based on this relationship.

Components similar to those in the embodiment 1 are given similar reference numerals and detail explanation thereon will be omitted.

According to this aspect, the external database is constructed to cut off the environment information on the image forming apparatus 13 and the parameter correction caused by the image forming apparatus 13 is made by the client server side. This provides approximately the same effect as the embodiment 1.

Embodiment 3

FIG. 17 shows an embodiment 3 of the image forming apparatus management system to which the invention is applied. In FIG. 17, basic configuration of the image forming apparatus management system is approximately the same as that of the embodiment 1. In the embodiment 3, unlike the embodiment 1, an image quality information measuring section 505 for measuring print image quality of a print section 502 as well as an environment information measuring section 503 is provided on the image forming apparatus 13. The image quality information and the environment information can be transmitted by an image/environment information transmission section 506 to the client server 14. On the other hand, an image quality/environment information receiving section 406 is provided on the client server 14 so that image quality information and the environment information from the image forming apparatus 13 are received by the image quality/environment information receiving section 406 and that environment information from the image forming apparatus 13 is transmitted to the host server 16. Furthermore, an information determination section 602 comprises a function for analyzing image quality information.

According to this aspect, about the same as the embodiment 1, it is possible to optimize each parameter of the image forming apparatus 13 while taking the environment information on the image forming apparatus 13 into account. It is also possible to transmit the image quality information from the image quality information measuring section 505 to the host server 16 via the client sever 14 for image quality analysis by the host server 16. It is thus possible to check whether deliver of the external parameters by the host server 16 is optimum and thus to implement higher-performance image forming apparatus management system.

In case the image quality has proven poor as the result of the image quality analysis by the information determination section 602, the corresponding client machine 12 in the user environment 10 is notified of that information via the client server 14 and external parameters in the external database 603 are corrected as appropriate.

As mentioned earlier, an image forming apparatus management system according to the invention comprises a host server for retrieving various parameters satisfying the job conditions from an external database according to the external parameter request and delivering the parameters and a client server for making an external parameter request to the host server as well as supplying various parameters delivered from the host server to image forming apparatus. This allows easy and efficient setting of various parameters of image forming apparatus in order to fulfill the maximum performance of the image forming apparatus.

According to the invention, it is possible to reduces the information input by the client and to prevent failure in parameter setting errors on the image forming apparatus that accompanies information input errors, thus fulfilling the maximum performance of the image forming apparatus.

It is possible to directly make parameter setting to the individual image forming apparatus from an external database owned by the host server. This allows use of parameter set values during development provided the host server is operated by the maker, thereby assuming the optimum parameter setting based on each image forming apparatus.

An increase in the parameter information or review of parameter set values is supported by updates of the external database on the host server so that it is possible to always operate the image forming apparatus with the latest parameters.

What is claimed is:

1. An image forming apparatus management system comprises:
    a client machine adapted to issue a job instruction including a job condition;
    an image forming apparatus having a parameter adjustment unit, the image forming apparatus being set a value of a parameter in accordance with the job instruction;
    a host server having an external database storing a plurality of values of the parameter corresponding to predetermined job conditions, respectively; and
    a client server connected to the client machine, to the image forming apparatus, and to the host server, the client server enabling to communicate with the host server mutually,
    wherein the external database stores the plurality of values of the parameter so that at least the values correspond to brands of print sheets;
    the client server transmits a external parameter request to the host server and transmits a value of the parameter transmitted from the host server to the image forming apparatus; and
    the host server retrieves a value of the parameter meeting the job condition from the external database to transmit the retrieved value of the parameter to the client server in response to the external parameter request.

2. The image forming apparatus management system according to claim 1,
    wherein the parameter adjustment mechanism is a plurality of the parameter adjustment mechanisms; and
    the parameter is a plurality of parameters.

3. The image forming apparatus management system according to claim 1, wherein the client server transmits the external parameter request to the host server in response to a request by the client machine.

4. The image forming apparatus management system according to claim 1, further comprising an internal data base storing a plurality of values of the parameter corresponding to predetermined standard conditions, respectively, the internal data base disposed in one of the image forming apparatus, the client server, and the client machine, wherein the client server determines whether the external data base is used or not;

when the external data base is used, the host server retrieves a value of the parameter meeting the job condition from the external database to transmit the retrieved value of the parameters to the client server in response to the external parameter request;

when the external data base is not used, the client server retrieves a value of the parameter meeting the job condition from the internal database to transmit the retrieved value of the parameter to the image forming apparatus.

5. The image forming apparatus management system according to claim 1, wherein the host server periodically updates the external database.

6. The image forming apparatus management system according to claim 5, wherein the client machine has a display section; and the client machine can display whether the external database of the host server has been updated on the display section.

7. The image forming apparatus management system according to claim 1, wherein when the client server transmits the external parameter request to the host server, the host server transmits a job condition item information of the external database to the client machine via the client server; and when a predetermined job condition item is selected at the client machine, the host server transmits a value of the parameter meeting the selected job condition item.

8. The image forming apparatus management system according to claim 7, wherein the client machine has a job condition item display section; and the client machine can display the job condition item information of the external database transmitted from the host server on the job condition item display section.

9. The image forming apparatus management system according to claim 1, wherein the host server retrieves the value of the parameter meeting the job condition from the external database based on use condition of the image forming apparatus.

10. The image forming apparatus management system according to claim 1, wherein the client server transmits the value of the parameter transmitted from the host server to the image forming apparatus before the image forming apparatus starts a job.

11. The image forming apparatus management system according to claim 1, wherein after the client server transmits the value of the parameter transmitted from the host server to the image forming apparatus, the image forming apparatus automatically starts a job according to the job instruction from the client machine.

12. The image forming apparatus management system according to claim 1, wherein if the host server has transmitted the value of the parameter to the image forming apparatus via the client server, the host server can receive job result information from the image forming apparatus via the client server.

13. The image forming apparatus management system according to claim 1, wherein the image forming apparatus is a printer to execute a print job.

14. The image forming apparatus management system according to claim 13, wherein the printer has an image information measuring section adapted to measure an image information on result of the print job; and the printer transmits the image information to the host server via the client server.

* * * * *